(12) United States Patent
Mizukami et al.

(10) Patent No.: US 8,385,017 B2
(45) Date of Patent: Feb. 26, 2013

(54) SPINDLE MOTOR INCLUDING FLUID BEARING AND STORAGE DISK DRIVE INCLUDING THE SAME

(75) Inventors: Junya Mizukami, Kyoto (JP); Takayuki Oe, Kyoto (JP); Yoichi Sekii, Kyoto (JP); Naoki Sabashi, Kyoto (JP); Takehito Tamaoka, Kyoto (JP); Takashi Yamamoto, Kyoto (JP); Shigeki Horiki, Kyoto (JP); Kazushi Miura, Kyoto (JP); Mitsuhiro Takemoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/198,794

(22) Filed: Aug. 5, 2011

(65) Prior Publication Data
US 2012/0033329 A1  Feb. 9, 2012

(30) Foreign Application Priority Data

Aug. 9, 2010 (JP) ................................. 2010-178965
Mar. 3, 2011 (JP) ................................. 2011-046788

(51) Int. Cl.
*G11B 17/02* (2006.01)
*H02K 7/08* (2006.01)

(52) U.S. Cl. ....................... 360/99.08; 310/90

(58) Field of Classification Search ............... 360/98.07, 360/99.04, 99.08; 310/90, 90.5, 67 R; 384/100, 384/107

See application file for complete search history.

(56) References Cited

U.S. PATENT DOCUMENTS

| | | | |
|---|---|---|---|
| 5,880,545 A | 3/1999 | Takemura et al. | |
| 6,900,568 B2* | 5/2005 | LeBlanc et al. | 310/90 |
| 6,991,376 B2 | 1/2006 | Aiello et al. | |
| 7,005,768 B2* | 2/2006 | Tamaoka et al. | 310/90 |
| 7,201,517 B2* | 4/2007 | Gomyo et al. | 384/107 |
| 7,246,945 B2* | 7/2007 | Sodeoka et al. | 384/110 |
| 7,391,139 B2* | 6/2008 | Yamamoto | 310/90 |
| 7,612,476 B2* | 11/2009 | Kodama | 310/90 |
| 7,764,000 B2* | 7/2010 | Tamaoka | 310/90 |
| 8,008,819 B2* | 8/2011 | Mizukami | 310/90 |
| 2004/0090702 A1 | 5/2004 | Aiello et al. | |

(Continued)

FOREIGN PATENT DOCUMENTS

| JP | 08-275435 A | 10/1996 |
|---|---|---|
| JP | 2003-056555 A | 2/2003 |

(Continued)

OTHER PUBLICATIONS

Mizukami et al., "Motor and Storage Disk Drive," Chinese Patent Application No. 201210021666.6, filed Jan. 31, 2012.

(Continued)

*Primary Examiner* — Brian Miller
(74) *Attorney, Agent, or Firm* — Keating & Bennett, LLP

(57) ABSTRACT

In a motor, an annular radially extending gap is defined between an outer annular surface and a lower surface of an annular cover portion. The radially extending gap has an axial width smaller than a maximum width of an upper seal portion defined between an outer circumferential surface of an upper thrust portion and an inner circumferential surface of a tubular portion. An annular axially extending gap is defined between an inner cylindrical surface and a radially inner edge of the annular cover portion. The axially extending gap has a radial width smaller than the maximum width of the upper seal portion.

23 Claims, 27 Drawing Sheets

U.S. PATENT DOCUMENTS

| | | | |
|---|---|---|---|
| 2004/0091187 A1* | 5/2004 | Aiello et al. | 384/112 |
| 2006/0182374 A1 | 8/2006 | Schwamberger et al. | |
| 2007/0030591 A1 | 2/2007 | Engesser et al. | |
| 2007/0133911 A1 | 6/2007 | Nishimoto et al. | |
| 2008/0187257 A1 | 8/2008 | Engesser et al. | |
| 2008/0211334 A1* | 9/2008 | Tokuno et al. | 310/90 |
| 2008/0292228 A1 | 11/2008 | Yamashita et al. | |
| 2008/0309183 A1* | 12/2008 | Murakami et al. | 310/90 |
| 2009/0140587 A1 | 6/2009 | Popov et al. | |
| 2010/0124387 A1 | 5/2010 | Fuss et al. | |
| 2010/0142869 A1 | 6/2010 | Grantz et al. | |
| 2010/0266225 A1 | 10/2010 | Yamashita et al. | |
| 2011/0192210 A1 | 8/2011 | Yamashita et al. | |
| 2011/0285231 A1* | 11/2011 | Rehm et al. | 310/90 |
| 2012/0033329 A1* | 2/2012 | Mizukami et al. | 360/99.08 |

FOREIGN PATENT DOCUMENTS

| | | |
|---|---|---|
| JP | 2003-061295 A | 2/2003 |
| JP | 2006-105390 A | 4/2006 |
| JP | 2007-162759 A | 6/2007 |
| JP | 2009-136143 A | 6/2009 |
| JP | 2010-121775 A | 6/2010 |
| KR | 10-2010-0064349 A | 6/2010 |

OTHER PUBLICATIONS

Mizukami et al., "Spindle Motor and Storage Disk Drive," U.S. Appl. No. 13/198,776, filed Aug. 5, 2011.

Mizukami et al., "Spindle Motor and Storage Disk Drive," U.S. Appl. No. 13/198,784, filed Aug. 5, 2011.

Mizukami et al., "Spindle Motor and Storage Disk Drive," U.S. Appl. No. 13/198,787, filed Aug. 5, 2011.

Mizukami et al., "Spindle Motor and Storage Disk Drive," U.S. Appl. No. 13/198,793, filed Aug. 5, 2011.

Mizukami et al., "Spindle Motor and Storage Disk Drive," U.S. Appl. No. 13/198,797, filed Aug. 5, 2011.

Yamaguchi et al., "Method of Manufacturing Fluid Dynamic Bearing Mechanism, Motor, and Storage Disk Drive," U.S. Appl. No. 13/353,554, filed Jan. 19, 2012.

Tamaoka et al., "Motor and Storage Disk Drive," U.S. Appl. No. 13/353,557, filed Jan. 19, 2012.

Yamamoto et al., "Spindle Motor and Storage Disk Drive," U.S. Appl. No. 13/353,563, filed Jan. 19, 2012.

* cited by examiner

SPINDLE MOTOR INCLUDING FLUID BEARING AND STORAGE DISK DRIVE INCLUDING THE SAME

BACKGROUND OF THE INVENTION

1. Field of the Invention

The present invention relates to a spindle motor and more specifically to a spindle motor for use in a storage disk drive.

2. Description of the Related Art

Motors including a bearing mechanism using fluid dynamic pressure have often been used in storage disk drives. A spindle motor disclosed in JP-A 2009-136143 includes a fixed shaft, an annular bearing component, a rotor component, and an annular cover. The bearing component is arranged on an upper end portion of the fixed shaft. The bearing component is integrally provided with the fixed shaft. The rotor component is arranged radially outward of the fixed shaft. The annular cover is arranged above the bearing component. A radially outer end portion of the annular cover is adhered to an upper end portion of the rotor component. An outer circumferential surface of the bearing component is arranged opposite an inner circumferential surface of the upper end portion of the rotor component. A seal gap is defined between the outer circumferential surface of the bearing component and the inner circumferential surface of the upper end portion of the rotor component. The seal gap is covered by the annular cover. Paragraph [0043] of JP-A 2009-136143 states: "The annular cover 330 defines a labyrinth seal 348 arranged to additionally seal the seal gap 332 together with an upper end surface of the bearing component 318."

Another conventional dynamic pressure fluid bearing apparatus included in a spindle motor is disclosed in JP-A 2007-162759. This conventional dynamic pressure fluid bearing apparatus includes a shaft body and a tubular sleeve body inside which the shaft body is inserted. The shaft body is fixed to a base plate of the motor. The sleeve body is fixed to a rotor of the motor. The shaft body is provided with a first thrust flange and a second thrust flange. The first thrust flange and the second thrust flange are both annular and are arranged on an upper side and a lower side of the sleeve body, respectively. In the dynamic pressure fluid bearing apparatus, a radial bearing portion is defined between the shaft body and the sleeve body, and a thrust bearing portion is defined between each of the two thrust flanges and the sleeve body. In addition, the sleeve body includes communicating holes defined therein to provide communication between two thrust gaps. Tapered seal portions are defined in the vicinity of upper and lower end openings of the communicating holes.

Another example of a known fluid dynamic bearing motor is disclosed in U.S. Pat. No. 6,991,376. This fluid dynamic bearing motor includes a shaft, a top plate, a bottom plate, and a hub. The top plate is fixed to an upper end of the shaft and the bottom plate is fixed to a lower end of the shaft. The hub is arranged between the top plate and the bottom plate, and is supported so as to be rotatable with respect to the shaft. The hub includes a recirculation channel extending therethrough defined therein. An upper portion of the hub includes a projecting portion arranged radially outward of an outer edge portion of the top plate. A capillary seal is defined between the projecting portion and the outer edge portion of the top plate. A lower portion of the hub includes another projecting portion arranged radially outward of an outer edge portion of the bottom plate. A capillary seal is also defined between the other projecting portion and the outer edge portion of the bottom plate. The influence of a pressure gradient of a lubricating oil in each of the capillary seals is minimized by the recirculation channel being arranged radially inward of the capillary seals.

In some motors, a cap member is arranged in a rotating portion to cover a seal gap. The motor described in JP-A 2009-136143 is an example of one of these motors. In such a motor, there is a gap between the cap member and a component of a stationary portion which defines the seal gap, and this gap may permit an evaporated lubricating oil to pass therethrough to an outside of the motor. Moreover, an attempt to ensure sufficient rigidity of the cap member by increasing the thickness of the cap member leads to a failure to reduce the overall thickness of the motor. Moreover, a reduction in the thickness of the cap member may result in a reduction in the precision with which the cap member is shaped, and may lead to a contact of the cap member with the stationary portion during rotation of the motor.

In the motor disclosed in JP-A 2007-162759, a difference in pressure between the upper tapered seal portion and the lower tapered seal portion is large because of the large axial distance between a surface of a lubricating oil in the upper tapered seal portion and a surface of the lubricating oil in the lower tapered seal portion. Therefore, when the motor is oriented in a variety of directions, the surface of the lubricating oil in each tapered seal portion will fluctuate greatly. Because of this, it is necessary to provide a complicated design to prevent a leakage of the lubricating oil.

Similarly, with respect to the motor disclosed in U.S. Pat. No. 6,991,376, a difference in pressure between the upper capillary seal and the lower capillary seal is large because of the large axial distance between a surface of the lubricating oil in the upper capillary seal and a surface of the lubricating oil in the lower capillary seal.

SUMMARY OF THE INVENTION

A motor according to a preferred embodiment of the present invention includes a stationary portion and a rotating portion. The stationary portion includes a stator. The rotating portion includes a rotor magnet. The rotating portion is rotatably supported by the stationary portion through a lubricating oil. The stationary portion includes a shaft portion and an upper thrust portion. The shaft portion is centered on a central axis extending in a vertical direction. The upper thrust portion is arranged to extend radially outward from an upper portion of the shaft portion. The rotating portion includes a sleeve portion and an upper hub annular portion. The sleeve portion is arranged radially opposite an outer circumferential surface of the shaft portion and a lower surface of the upper thrust portion. The upper hub annular portion includes a tubular portion and an annular cover portion. The tubular portion is arranged to extend upward from an outer edge portion of the sleeve portion, and arranged radially opposite an outer circumferential surface of the upper thrust portion. The annular cover portion is arranged to extend radially inward from the tubular portion. The lower surface of the upper thrust portion and an upper surface of the sleeve portion are arranged to together define an upper thrust gap therebetween, and the lubricating oil is provided within the upper thrust gap. The outer circumferential surface of the upper thrust portion and an inner circumferential surface of the tubular portion are arranged to together define an upper seal portion therebetween. The upper thrust gap is arranged in communication with the upper seal portion. The upper seal portion includes a surface of the lubricating oil located therein. The upper thrust portion includes an inner cylindrical surface and an outer annular surface. The inner cylindrical surface is arranged substantially in a shape of a cylinder, is arranged radially inward of the outer circumferential surface to extend in the vertical direction or substantially in the vertical direction, and includes an upper end arranged at an axial level higher than that of an upper end of the outer circumferential surface. The outer annular surface is arranged radially outward of the inner cylindrical surface, and arranged at an axial level lower than that of the upper end of the inner cylindrical surface. The outer annular surface is defined by an annular surface perpendicular or substantially perpendicular to the central axis. The outer annular surface and a lower surface of the annular cover portion are arranged to together define an annular radially extending gap therebetween, and the radially extending gap has an axial width smaller than a maximum width of the upper seal portion. The inner cylindrical surface and a radially inner edge of the annular cover portion are arranged to together define an annular axially extending gap therebetween, and the axially extending gap has a radial width smaller than the maximum width of the upper seal portion.

A motor according to another preferred embodiment of the present invention includes a stationary portion and a rotating portion. The stationary portion includes a stator. The rotating portion includes a rotor magnet. The rotating portion is rotatably supported by the stationary portion through a lubricating oil. The stationary portion includes a shaft portion and an upper thrust portion. The shaft portion is centered on a central axis extending in a vertical direction. The upper thrust portion is arranged to extend radially outward from an upper portion of the shaft portion. The rotating portion includes a sleeve portion and an upper hub annular portion. The sleeve portion is arranged radially opposite an outer circumferential surface of the shaft portion and a lower surface of the upper thrust portion. The upper hub annular portion includes a tubular portion and an annular cover portion. The tubular portion is arranged to extend upward from an outer edge portion of the sleeve portion, and arranged radially opposite an outer circumferential surface of the upper thrust portion. The annular cover portion is arranged to extend radially inward from the tubular portion. The lower surface of the upper thrust portion and an upper surface of the sleeve portion are arranged to together define an upper thrust gap therebetween, and the lubricating oil is arranged in the upper thrust gap. The outer circumferential surface of the upper thrust portion and an inner circumferential surface of the tubular portion are arranged to together define an upper seal portion therebetween, and the upper thrust gap is arranged in communication with the upper seal portion. The upper seal portion includes a surface of the lubricating oil located therein. The upper thrust portion includes an inner cylindrical surface, an outer annular surface, and a groove portion. The inner cylindrical surface is arranged substantially in a shape of a cylinder, and arranged radially inward of the outer circumferential surface to extend in the vertical direction or substantially in the vertical direction, and includes an upper end arranged at a level higher than that of an upper end of the outer circumferential surface. The outer annular surface is arranged radially outward of the inner cylindrical surface, and arranged at an axial level lower than that of the upper end of the inner cylindrical surface. The outer annular surface is defined by an annular surface perpendicular or substantially perpendicular to the central axis. The groove portion is annular, recessed downward, and defined between the inner cylindrical surface and the outer annular surface. A radially inner edge of the annular cover portion includes an inner annular projecting portion arranged to project downward, and a lower end of the inner annular projecting portion is arranged inside the groove portion. Accordingly, the preferred embodiments of the present invention are able to achieve a reduction in evaporation of the lubricating oil.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

It is assumed herein that an upper side and a lower side in a direction parallel or substantially parallel to a central axis of a motor are referred to as an "upper side" and a "lower side", respectively. Note that the terms "vertical direction", "upper side", "lower side", and the like as used herein are not meant to indicate relative positions or directions of different members or portions when actually installed in a device. Also note that directions parallel to or substantially parallel to the central axis are referred to by the term "axial direction", "axial", or "axially", that directions radiating from the central axis are simply referred to by the term "radial direction", "radial", or "radially", and that a circumferential direction about the central axis is simply referred to by the term "circumferential direction", "circumferential", or "circumferentially".

First Preferred Embodiment

Figure 1:
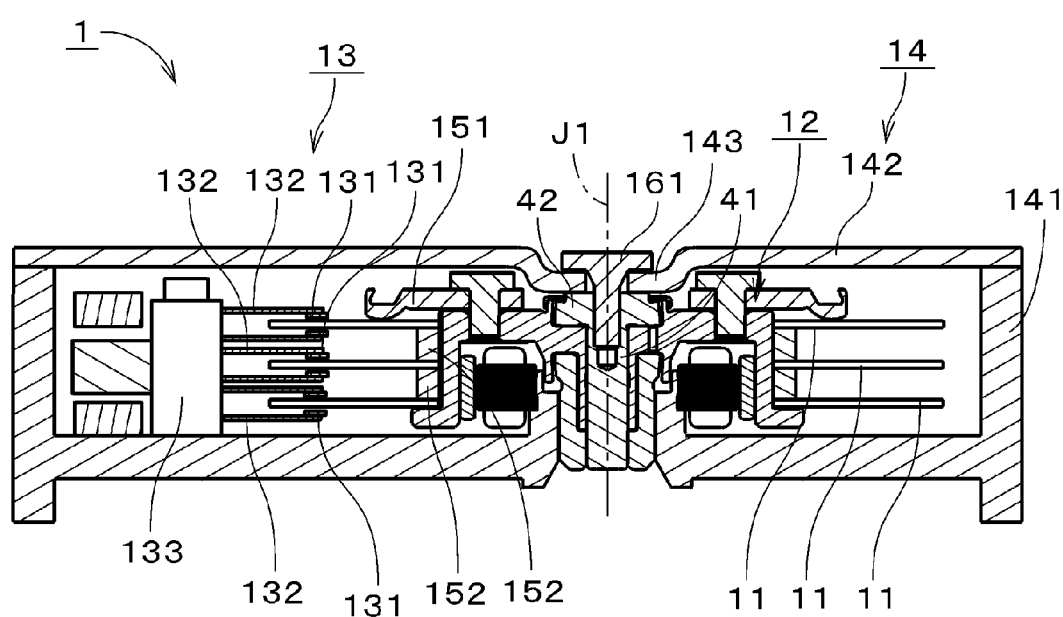
FIG. 1 is a cross-sectional view of a storage disk drive according to a first preferred embodiment of the present invention.

FIG. 1 is a cross-sectional view of a storage disk drive 1 including a spindle motor (hereinafter referred to simply as a "motor") 12 according to a first preferred embodiment of the present invention. The storage disk drive 1 is preferably a so-called hard disk drive. The storage disk drive 1 preferably includes three disks 11, the motor 12, an access portion 13, and a housing 14, for example. The motor 12 is arranged to rotate the disks 11, on which information is stored. The access portion 13 is arranged to read and/or write information from or to the disks 11. In other words, the access portion 13 may be arranged to perform at least one of reading and writing of information from or to the disks 11.

The housing 14 preferably includes a lower housing member 141 and an upper plate member 142. The lower housing member 141 is in the shape of a box without a lid. The upper plate member 142 preferably has a flat shape, such as that of a plate. The disks 11, the motor 12, and the access portion 13 are arranged inside the lower housing member 141. The upper plate member 142 is fitted to the lower housing member 141 to define the housing 14. An interior space of the storage disk drive 1 is preferably a clean space with no dirt or dust, or only an extremely small amount of dirt or dust. In the present preferred embodiment, the interior space of the storage disk drive 1 is filled with air. Note that the interior space of the storage disk drive 1 may alternatively be filled with helium gas, hydrogen gas, a mixture of either or both of these gases and air, or any other desirable gas.

The three disks 11 are fixed to a rotor hub of the motor 12 through a clamper 151 and spacers 152 such that the disks 11 are arranged at regular intervals in a direction parallel or substantially parallel to a central axis J1 of the motor 12. The access portion 13 includes six heads 131, six arms 132, and a head actuator mechanism 133. Each of the heads 131 is arranged in close proximity to one of the disks 11 to read and write information from or to the disk 11. Note that the head 131 may be arranged to perform at least one of the reading and writing of information from or to the disk 11. Each of the arms 132 is arranged to support an associated one of the heads 131. The head actuator mechanism 133 is arranged to move each of the arms 132 to move an associated one of the heads 131 relative to an associated one of the disks 11. The above mechanism enables the head 131 to make access to a desired location on the disk 11 with the head 131 being arranged in close proximity to the rotating disk 11. Note that the number of disks 11 is not limited to three, but may instead be one, two, or any other desirable number greater than three.

Figure 2:
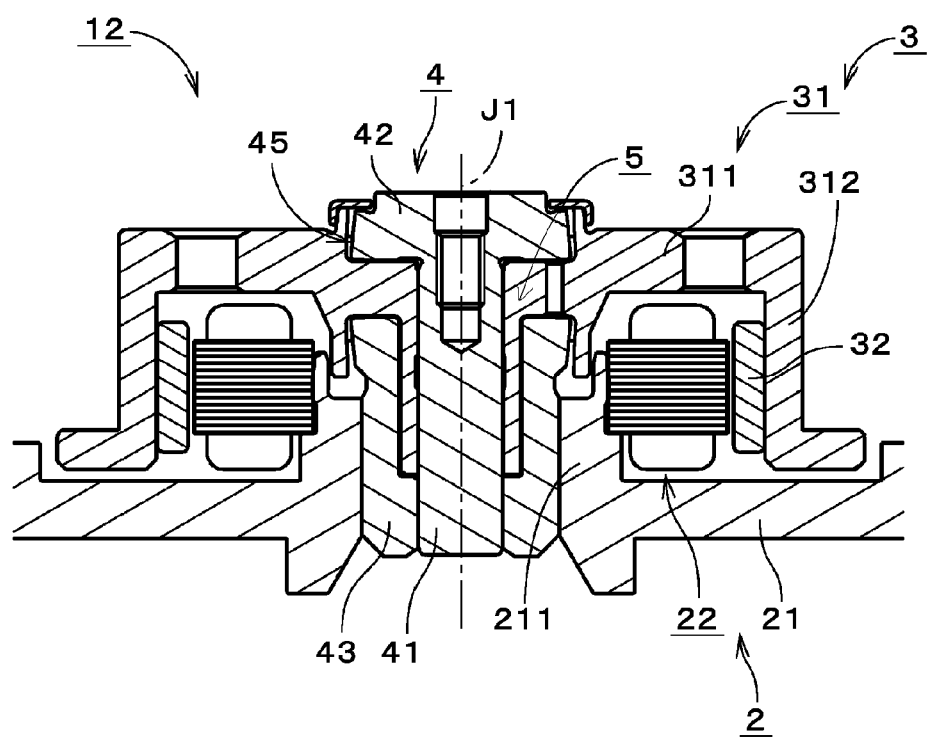
FIG. 2 is a cross-sectional view of a motor according to the first preferred embodiment.

FIG. 2 is a cross-sectional view of the motor 12. The motor 12 is an outer-rotor motor. The motor 12 includes a stationary portion 2, which is a stationary assembly, and a rotating portion 3, which is a rotating assembly. In FIG. 2, a fluid dynamic bearing mechanism (hereinafter referred to as a "bearing mechanism") defined by a portion of the stationary portion 2 and a portion of the rotating portion 3 is indicated by reference numeral "4". The rotating portion 3 is supported through a lubricating oil 45 such that the rotating portion 3 is rotatable about the central axis J1 of the motor 12 with respect to the stationary portion 2.

The stationary portion 2 preferably includes a base plate 21, i.e., a base portion, a stator 22, a shaft portion 41, an upper thrust portion 42, and a lower thrust portion 43. The base plate 21 and the lower housing member 141 illustrated in FIG. 1 are preferably integrally defined by a single monolithic member and define a portion of the housing 14. The stator 22 is fixed to a circumference of a cylindrical holder 211 defined in the base plate 21. A hole portion is defined inside the holder 211. Note that the base plate 21 and the lower housing member 141 may be defined by separate members. The shaft portion 41 and the upper thrust portion 42 are defined by a single monolithic member. The shaft portion 41 includes a screw hole defined in an upper portion thereof. Referring to FIG. 1, a central portion 143 of the upper plate member 142 is recessed axially downward. Hereinafter, the central portion 143 will be referred to as a "plate central portion 143". A screw 161, for example, is preferably inserted into a through hole defined in the plate central portion 143 and the screw hole of the shaft portion 41, so that the plate central portion 143 and the shaft portion 41 are fixed to each other. A lower surface of the plate central portion 143 is arranged in direct contact with an upper surface of the upper thrust portion 42, whereby the upper plate member 142 is securely fixed to the motor 12. Moreover, because the shaft portion 41 and the upper thrust portion 42 are defined by a single monolithic member, an improvement in strength is achieved with which the upper plate member 142 is joined to the motor 12.

Referring to FIG. 2, the rotating portion 3 includes a rotor hub 31 and a rotor magnet 32. The rotor hub 31 preferably includes a substantially cylindrical sleeve portion 5, a cover portion 311, and a cylindrical portion 312. The cover portion 311 is arranged to extend radially outward from an upper portion of the sleeve portion 5. The cylindrical portion 312 is arranged to extend axially downward from an outer edge portion of the cover portion 311. The rotor magnet 32 is fixed to an inside of the cylindrical portion 312. The rotor magnet 32 is arranged radially opposite the stator 22. The rotating portion 3 is arranged to be rotated in response to a torque that is generated between the stator 22 and the rotor magnet 32. Note that, if so desired, the sleeve portion 5 may be defined by a member separate from the cover portion 311 and the cylindrical portion 312. In this case, the sleeve portion 5 is fixed to the cover portion 311.

Figure 3:
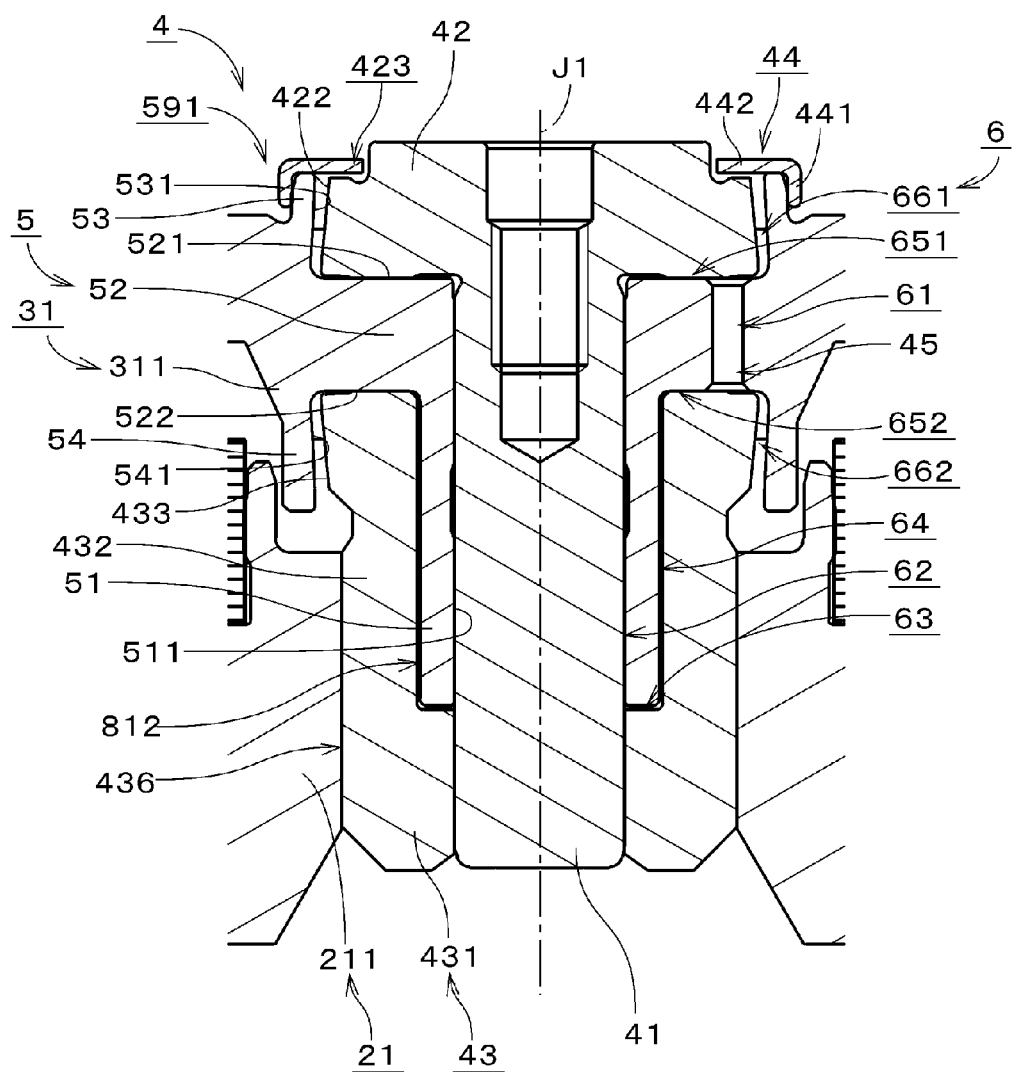
FIG. 3 is a cross-sectional view of a bearing mechanism according to the first preferred embodiment.

FIG. 3 is an enlarged view of the bearing mechanism 4. The bearing mechanism 4 preferably includes the shaft portion 41, the upper thrust portion 42, the lower thrust portion 43, the sleeve portion 5, an annular seal cap 44, i.e., a cap member, and the lubricating oil 45. As mentioned above, each of the shaft portion 41, the upper thrust portion 42, and the lower thrust portion 43 preferably defines a portion of the stationary portion 2, while each of the sleeve portion 5 and the seal cap defines a portion of the rotating portion 3. The shaft portion 41 is, for example, press fitted so as to be fixed to a hole portion defined inside the lower thrust portion 43. The shaft portion 41 is arranged to orient in the vertical direction along the central axis J1. The upper thrust portion 42 includes an upper plate portion which is preferably flat, such that it possesses the shape of a plate, and arranged to extend radially outward from the upper portion of the shaft portion 41. The shaft portion 41 and the upper thrust portion 42 are preferably made of stainless steel or the like, for example. An outer circumferential surface 422 of the upper thrust portion 42 includes an inclined surface that is angled in a radially inward direction with increasing height. The upper thrust portion 42 preferably includes a downward recessed shoulder portion 423 defined in an outer edge portion of the upper surface thereof.

The lower thrust portion 43 preferably includes a lower plate portion 431 and an outer tubular portion 432. The lower thrust portion 43 preferably is made of copper, high-strength brass, or the like, for example. The lower plate portion 431 is arranged to extend radially outward from a lower portion of the shaft portion 41. The outer tubular portion 432 is arranged to extend upward from an outer edge portion of the lower plate portion 431. An upper portion of an outer circumferential surface of the outer tubular portion 432 includes an inclined surface 433 that is angled in the radially inward direction with decreasing height.

In assembling the motor 12, a lower portion of the outer circumferential surface of the outer tubular portion 432 is fixed to an inner circumferential surface of the holder 211 of the base plate 21 through, for example, an adhesive. In comparison to press fitting, the above method enables the vertical positioning of the outer tubular portion 432 relative to the base plate 21 to be achieved with greater precision, whereby improved precision in the height of the motor 12 is achieved.

The sleeve portion 5 includes an inner tubular portion 51 and a flange portion 52. The sleeve portion 5 is preferably made of stainless steel, aluminum, copper, or the like, for example. The inner tubular portion 51 is arranged in a substantially cylindrical space defined between the outer tubular portion 432 and the shaft portion 41. The flange portion 52 is arranged to project radially outward from an upper portion of the inner tubular portion 51. The axial thickness of the flange portion 52 is preferably a half or less than a half of the axial dimension of an inner circumferential surface 511 of the inner tubular portion 51, for example. Both an upper surface 521 and a lower surface 522 of the flange portion 52 are preferably arranged to be substantially perpendicular to the central axis J1. The flange portion 52 includes a communicating hole 61 arranged to extend through the flange portion 52 in the vertical direction. The number of communicating holes 61 preferably is one, for example, in the present preferred embodiment. However, if so desired, two or more communicating holes 61 could also be defined in the flange portion.

The cover portion 311 of the rotor hub 31 includes an upper hub tubular portion 53 and a lower hub tubular portion 54. The upper hub tubular portion 53 is arranged substantially in the shape of a cylinder, and is arranged to extend axially upward from an outer edge portion of the sleeve portion 5, i.e., an outer edge portion of the flange portion 52. The upper hub tubular portion 53 is arranged radially outward of the upper thrust portion 42. An inner circumferential surface 531 of the upper hub tubular portion 53 includes a portion that is angled in the radially inward direction with increasing height. Hereinafter, the upper hub tubular portion 53 and the seal cap 44, which are arranged above the outer edge portion of the flange portion 52 and each of which defines a portion of the rotating portion 3, will be collectively referred to as an "upper hub annular portion 591".

The lower hub tubular portion 54 is arranged substantially in the shape of a cylinder, and is arranged to extend downward from the outer edge portion of the flange portion 52. The lower hub tubular portion 54 is arranged radially outward of the outer tubular portion 432 of the lower thrust portion 43. An inner circumferential surface 541 of the lower hub tubular portion 54 includes a portion that is angled in the radially inward direction with decreasing height. Note that the upper and lower hub tubular portions 53 and 54 may be defined by members separate from the flange portion 52 or the cover portion 311.

The seal cap 44 preferably includes a cap cylindrical portion 441 and a cap cover portion 442. The cap cylindrical portion 441 is centered on the central axis J1. The cap cover portion 442 is substantially annular, and is arranged to extend radially inward from the cap cylindrical portion 441. The cap cylindrical portion 441, which is an outer edge portion of the seal cap 44, is fitted to the upper hub tubular portion 53, whereby the seal cap 44 is attached to the sleeve portion 5. When the seal cap 44 is attached to the upper hub tubular portion 53, the cap cylindrical portion 441 is arranged in direct radial contact with an outer circumferential surface of the upper hub tubular portion 53, and the cap cover portion 442 is arranged in axial contact with an upper surface of the upper hub tubular portion 53. The cap cylindrical portion 441 and the upper hub tubular portion 53 together define a tubular portion of the upper hub annular portion 591 which is arranged to extend upward from the outer edge portion of the flange portion 52. In addition, the cap cover portion 442 defines an annular cover portion of the upper hub annular portion 591 which is arranged to extend radially inward from the tubular portion. A radially inner portion of the cap cover portion 442 is arranged above a bottom portion of the shoulder portion 423.

Referring to FIG. 2, the rotating portion 3, which includes the sleeve portion 5, is arranged to rotate through the lubricating oil 45 with respect to the shaft portion 41, the upper thrust portion 42, and the lower thrust portion 43 while the motor 12 is driven.

Figure 4:
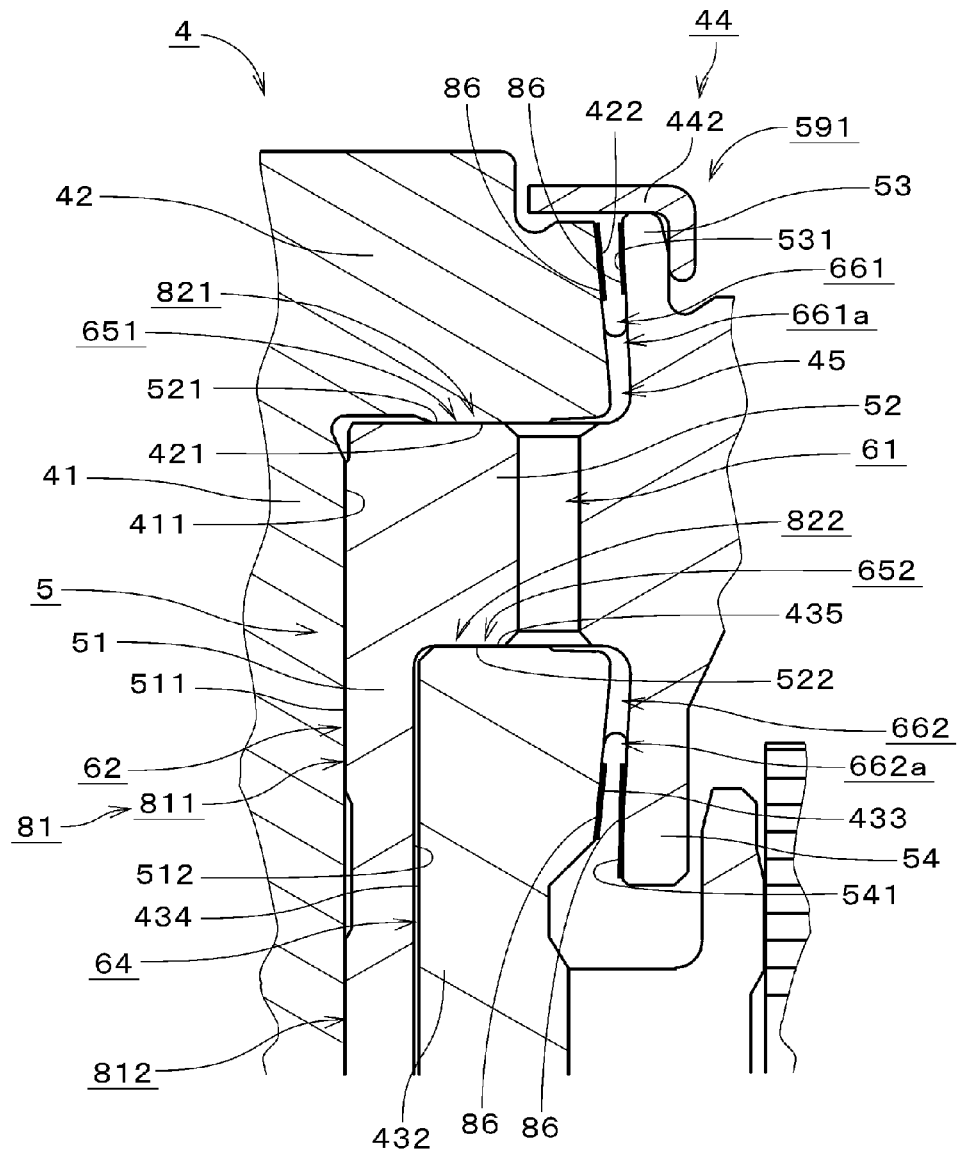
FIG. 4 is a cross-sectional view of the bearing mechanism according to the first preferred embodiment.

FIG. 4 is an enlarged view of an upper portion of the bearing mechanism 4. An outer circumferential surface 411 of the shaft portion 41 is arranged radially opposite the inner circumferential surface 511 of the inner tubular portion 51 of the sleeve portion 5. A radial gap 62 is defined between the shaft portion 41 and the inner tubular portion 51. The radial width of the radial gap 62 is preferably in the range of about 2 μm to about 4 μm, for example. Referring to FIG. 3, an axial gap 63 is defined between a lower end of the inner tubular portion 51 and the lower plate portion 431. Hereinafter, the gap 63 will be referred to as a "lower end gap 63". Note that, in the present preferred embodiment, the radial gap 62 corresponds to a first gap.

Referring to FIG. 4, a gap 64 in the shape of a cylinder is defined between an outer circumferential surface 512 of the inner tubular portion 51 and an inner circumferential surface 434 of the outer tubular portion 432. Hereinafter, the gap 64 will be referred to as a "cylindrical gap 64". Referring to FIG. 3, the cylindrical gap 64 is arranged in communication with the radial gap 62 through the lower end gap 63. The radial width of the cylindrical gap 64 is preferably greater than the radial width of the radial gap 62 and smaller than the diameter of the communicating hole 61. Note that, in the present preferred embodiment, the cylindrical gap 64 corresponds to a second gap.

Referring to FIG. 4, a gap 651 is defined between a region of the upper surface 521 of the flange portion 52 which is radially inward of the communicating hole 61 and a lower surface 421 of the upper thrust portion 42, which is arranged axially opposite the upper surface 521. Hereinafter the gap 651 will be referred to as an "upper thrust gap 651". In addition, a gap 652 is defined between a region of the lower surface 522 of the flange portion 52 which is radially inward of the communicating hole 61 and an upper surface 435 of the outer tubular portion 432. Hereinafter, the gap 652 will be referred to as a "lower thrust gap 652". The upper and lower thrust gaps 651 and 652 are arranged in communication with each other through the communicating hole 61. In the bearing mechanism 4, the radial gap 62, the lower end gap 63, the cylindrical gap 64, the upper and lower thrust gaps 651 and 652, and the communicating hole 61 are arranged from a radial inside to a radial outside in this order. Note that, in the present preferred embodiment, the lower thrust gap 652 corresponds to a third gap.

The inner circumferential surface 531 of the upper hub tubular portion 53 is arranged radially opposite the outer circumferential surface 422 of the upper thrust portion 42. A gap 661 is defined between the upper hub tubular portion 53 and the upper thrust portion 42. The upper thrust gap 651 is arranged in communication with the gap 661. The gap 661 is preferably arranged radially outward of the radial gap 62, the upper thrust gap 651, and the communicating hole 61. The gap 661 is arranged to gradually increase in width with increasing height, that is, with decreasing distance from an upper end opening of the gap 661. Hereinafter, the gap 661 will be referred to as an "upper seal gap 661". In addition, the upper seal gap 661 is arranged to be angled toward the central axis J1 with increasing height. In other words, the upper seal gap 661 is arranged to be angled to the left in FIG. 4 with increasing height. A surface of the lubricating oil 45 is located in the upper seal gap 661. The lubricating oil 45 is retained in the upper seal gap 661 through capillary action. An upper seal portion 661a arranged to retain the lubricating oil 45 is thus defined in the upper seal gap 661. The inner circumferential surface 531 and the outer circumferential surface 422 are preferably coated with oil-repellent films 86 above the surface of the lubricating oil 45 in the upper seal gap 661. The upper end opening of the upper seal gap 661 is covered with the cap cover portion 442 of the seal cap 44.

The inner circumferential surface 541 of the lower hub tubular portion 54 is arranged radially opposite the inclined surface 433 of the outer tubular portion 432. A gap 662 extending downward is defined between the lower hub tubular portion 54 and the outer tubular portion 432. The gap 662 is arranged radially outward of the radial gap 62, the lower end gap 63, the cylindrical gap 64, the lower thrust gap 652, and the communicating hole 61. The gap 662 is arranged to gradually increase in width with decreasing height, that is, with decreasing distance from a lower end opening of the gap 662. Hereinafter, the gap 662 will be referred to as a "lower seal gap 662". In addition, the lower seal gap 662 is arranged to be angled toward the central axis J1 with decreasing height. That is, the lower seal gap 662 is arranged to be inclined to the left in FIG. 4 with decreasing height. A surface of the lubricating oil 45 is located in the lower seal gap 662. The lubricating oil 45 is retained in the lower seal gap 662 through capillary action. A lower seal portion 662a arranged to retain the lubricating oil 45 is defined in the lower seal gap 662. The inner circumferential surface 541 and the inclined surface 433 are coated with oil-repellent films 86 below the surface of the lubricating oil 45 in the lower seal gap 662. The same holds true for other preferred embodiments described below. In the bearing mechanism 4, the upper and lower seal gaps 661 and 662 are arranged in communication with each other through the communicating hole 61.

The axial distance between the surface of the lubricating oil 45 in the upper seal portion 661a and the surface of the lubricating oil 45 in the lower seal portion 662a is shorter than the axial length of the radial gap 62. Moreover, the length of the communicating hole 61 is shorter than the axial distance between the surface of the lubricating oil 45 in the upper seal portion 661a and the surface of the lubricating oil 45 in the lower seal portion 662a. It is assumed here that the distance between the surface of the lubricating oil 45 in the upper seal portion 661a and the surface of the lubricating oil 45 in the lower seal portion 662a refers to the distance between an upper end of the surface of the lubricating oil 45 in the upper seal portion 661a and a lower end of the surface of the lubricating oil 45 in the lower seal portion 662a.

Referring to FIG. 3, the radially outside diameter of the upper seal gap 661 is preferably substantially equal to the radially outside diameter of the lower seal gap 662. This makes it possible to arrange the communicating hole 61 to extend in parallel or substantially in parallel with the central axis J1. It is assumed here that the outside diameter of the upper seal gap 661 refers to the outside diameter of an innermost portion of the upper seal gap 661, and that the outside diameter of the lower seal gap 662 refers to the outside diameter of an innermost portion of the lower seal gap 662.

In the bearing mechanism 4, the communicating hole 61 and a space 6 extending from the upper seal gap 661 to the lower seal gap 662 through the upper thrust gap 651, the radial gap 62, the lower end gap 63, the cylindrical gap 64, and the lower thrust gap 652 are continuously filled with the lubricating oil 45. When the bearing mechanism 4 is constructed, the lubricating oil 45 is fed into the bearing mechanism 4 through the lower seal gap 662 with the lower seal gap 662 arranged to face axially upward in the direction of gravity. It is possible to control the amount of the lubricating oil 45 by visually identifying the height of the surface of the lubricating oil 45 in the lower seal gap 662.

Note that the visual identification may be conducted either with eyes alone or with a magnified view of the lower seal gap 662 with the aid of a device such as, for example, a microscope. Also note that the visual identification may be conducted with a magnified image of the lower seal gap 662 shown on a screen with the aid of a device.

Figure 5:
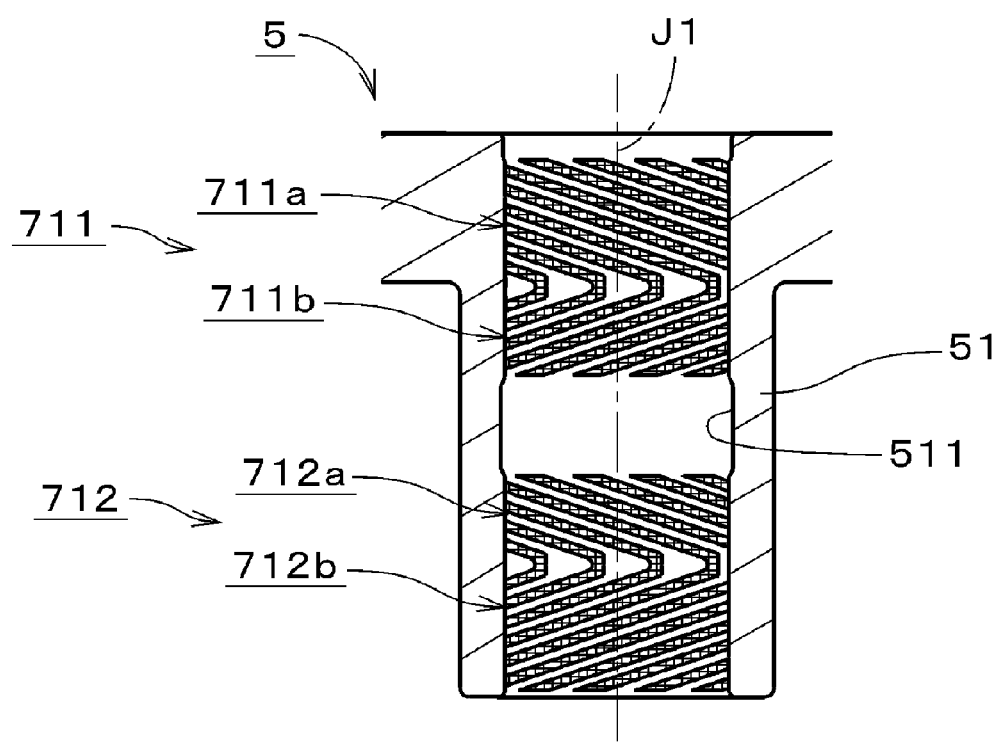
FIG. 5 is a cross-sectional view of a sleeve portion according to the first preferred embodiment.

FIG. 5 is a cross-sectional view of the sleeve portion 5. In FIG. 5, the shape of the sleeve portion 5 beyond a cross section thereof is also depicted. The inner tubular portion 51 includes an upper radial dynamic pressure groove array 711 and a lower radial dynamic pressure groove array 712. The upper radial dynamic pressure groove array 711 is defined in a portion of the inner circumferential surface 511 which is on an upper side of a substantial axial middle thereof. The lower radial dynamic pressure groove array 712 is defined in a portion of the inner circumferential surface 511 which is on a lower side of the substantial axial middle thereof. In FIG. 5, dynamic pressure grooves are indicated by cross-hatching. Also in other figures referenced below, dynamic pressure grooves are indicated by cross-hatching. The upper radial dynamic pressure groove array 711 includes a collection of grooves arranged in, for example, a herringbone pattern, that is, a collection of a plurality of grooves each of which is arranged substantially in the shape of the letter "V" in horizontal orientation along a circumferential direction of the inner circumferential surface 511. The axial dimension of an upper portion of the upper radial dynamic pressure groove array 711 is preferably arranged to be greater than that of a lower portion of the upper radial dynamic pressure groove array 711. Hereinafter, the upper portion and the lower portion of the upper radial dynamic pressure groove array 711 will be referred to as a "groove upper portion 711a" and a "groove lower portion 711b", respectively. The lower radial dynamic pressure groove array 712 is also defined by grooves arranged in the herringbone pattern. The axial dimension of a groove upper portion 712a of the lower radial dynamic pressure groove array 712 is arranged to be smaller than that of a groove lower portion 712b of the lower radial dynamic pressure groove array 712.

The lower thrust gap 652 illustrated in FIG. 4 is arranged at a level higher than that of an upper end of the groove upper portion 712a of the lower radial dynamic pressure groove array 712. In the radial gap 62, a radial dynamic pressure bearing 81 arranged to generate a radial fluid dynamic pressure acting on the lubricating oil 45 is defined through the upper and lower radial dynamic pressure groove arrays 711 and 712. Hereinafter, an upper dynamic pressure bearing portion corresponding to the upper radial dynamic pressure groove array 711 will be referred to as an "upper radial dynamic pressure bearing portion 811", while a lower dynamic pressure bearing portion corresponding to the lower radial dynamic pressure groove array 712 will be referred to as a "lower radial dynamic pressure bearing portion 812". The lower radial dynamic pressure bearing portion 812 is arranged to overlap in a radial direction with a fixing region 436 where the lower portion of the outer circumferential surface of the outer tubular portion 432 and the holder 211 of the base plate 21 illustrated in FIG. 3 are fixed to each other.

Note that it is enough that the level of the lower thrust gap 652 should be arranged to be higher than that of the upper end of at least one of the dynamic pressure grooves constituting the lower radial dynamic pressure groove array 712. Also note that the level of the lower thrust gap 652 may be arranged to be higher than that of the upper end of each of all the dynamic pressure grooves constituting the lower radial dynamic pressure groove array 712. These arrangements fall within the scope of preferred embodiments of the present invention.

Figure 6:
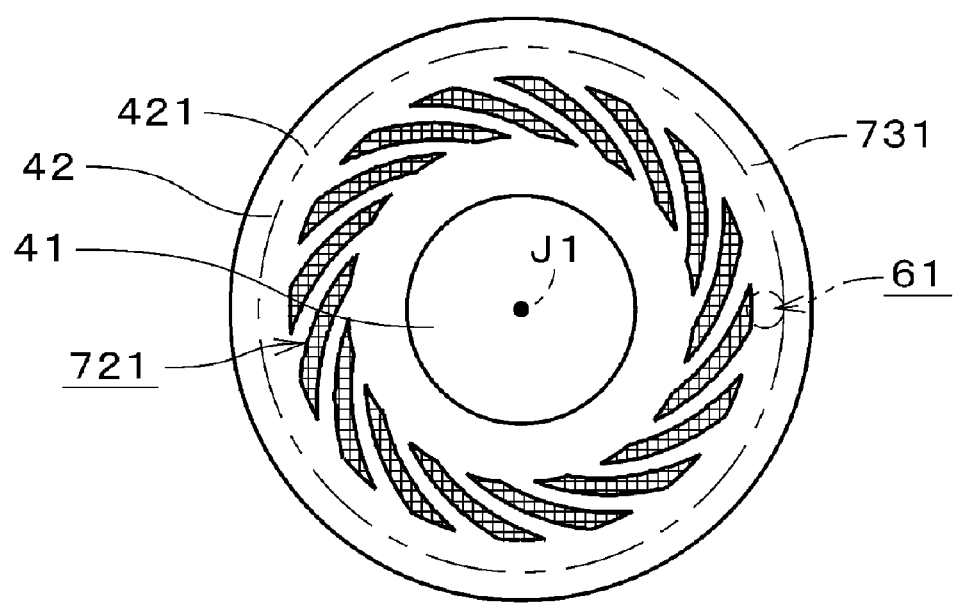
FIG. 6 is a bottom view of a shaft portion and an upper thrust portion according to the first preferred embodiment.

FIG. 6 is a bottom view of the shaft portion 41 and the upper thrust portion 42. In FIG. 6, a position corresponding to the communicating hole 61 is indicated by a chain double-dashed line. The same holds true for FIG. 7. The lower surface 421 of the upper thrust portion 42 includes an upper thrust dynamic pressure groove array 721 arranged in a spiral pattern defined therein. The upper thrust dynamic pressure groove array 721 is arranged radially inward of a circle 731 which is centered on the central axis J1 and which touches an upper end opening of the communicating hole 61 at a radially outer point. Note that, in the case where the upper end opening is provided with a chamfer, the upper thrust dynamic pressure groove array 721 is arranged radially inward of a circle which is centered on the central axis J1 and which touches the chamfer at a radially outer point. In addition, an outer circumferential portion of the upper thrust dynamic pressure groove array 721 is arranged to overlap with the upper end opening of the communicating hole 61. In the upper thrust gap 651 illustrated in FIG. 4, a dynamic pressure bearing portion 821, which is a dynamic pressure generation portion arranged to generate a fluid dynamic pressure acting on the lubricating oil 45 in a thrust direction, is defined through the upper thrust dynamic pressure groove array 721. Hereinafter, the dynamic pressure bearing portion 821 will be referred to as an "upper thrust dynamic pressure bearing portion 821".

Note that it is enough that at least one of the dynamic pressure grooves defining the upper thrust dynamic pressure groove array 721 should be arranged radially inward of the circle 731. Also note that all of the dynamic pressure grooves defining the upper thrust dynamic pressure groove array 721 may be arranged radially inward of the circle 731. These arrangements fall within the scope of preferred embodiments of the present invention.

Figure 7:
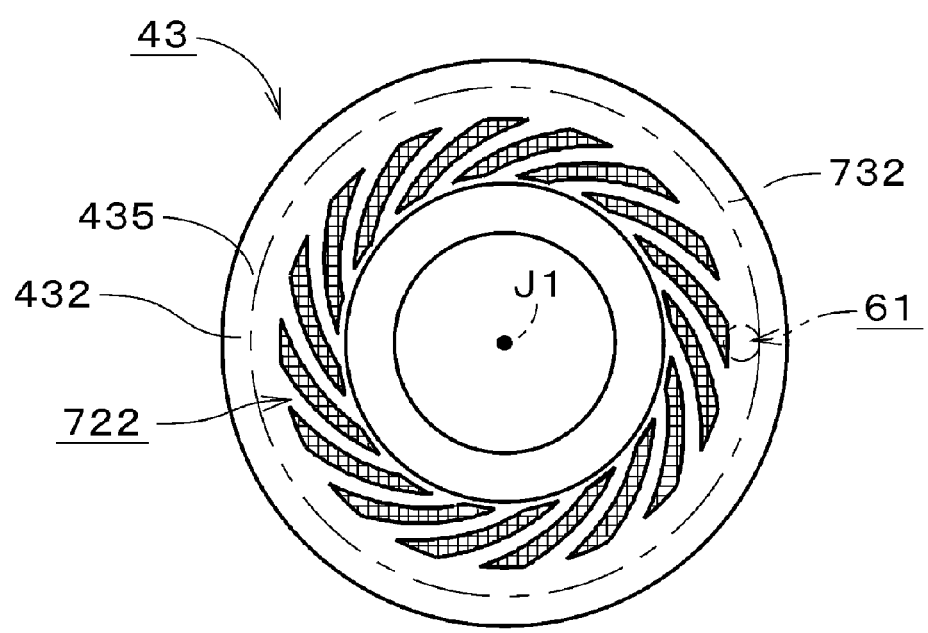
FIG. 7 is a plan view of a lower thrust portion according to the first preferred embodiment.

FIG. 7 is a plan view of the lower thrust portion 43. The upper surface 435 of the outer tubular portion 432 includes a lower thrust dynamic pressure groove array 722 arranged in the spiral pattern defined therein. The lower thrust dynamic pressure groove array 722 is arranged radially inward of a circle 732 which is centered on the central axis J1 and which touches a lower end opening of the communicating hole 61 at a radially outer point. Note that, in the case where the lower end opening is provided with a chamfer, the lower thrust dynamic pressure groove array 722 is arranged radially inward of a circle which is centered on the central axis J1 and which touches the chamfer at a radially outer point. In addition, an outer circumferential portion of the lower thrust dynamic pressure groove array 722 is arranged to overlap with the lower end opening of the communicating hole 61. In the lower thrust gap 652 illustrated in FIG. 4, a dynamic pressure bearing portion 822, which is a dynamic pressure generation portion arranged to generate a fluid dynamic pressure acting on the lubricating oil 45 in the thrust direction, is defined through the lower thrust dynamic pressure groove array 722. Hereinafter, the dynamic pressure bearing portion 822 will be referred to as a "lower thrust dynamic pressure bearing portion 822".

Note that it is enough that at least one of the dynamic pressure grooves defining the lower thrust dynamic pressure groove array 722 should be arranged radially inward of the circle 732. Also note that all of the dynamic pressure grooves defining the lower thrust dynamic pressure groove array 722 may be arranged radially inward of the circle 732. These arrangements fall within the scope of preferred embodiments of the present invention.

Even when the upper thrust dynamic pressure groove array 721 is arranged to overlap with the upper end opening of the communicating hole 61, and the lower thrust dynamic pressure groove array 722 is arranged to overlap with the lower end opening of the communicating hole 61, a difference in pressure between an interior and an exterior of the communicating hole 61 is eliminated through the inclusion of a region where neither the upper thrust dynamic pressure groove array 721 nor the lower thrust dynamic pressure groove array 722 is provided. As a result, a reduction in the difference in pressure between the upper and lower seal portions 661a and 662a is achieved.

While the motor 12 is driven, the inner tubular portion 51 of the sleeve portion 5 is supported by the radial dynamic pressure bearing 81 in the radial direction with respect to the shaft portion 41, while the flange portion 52 is supported by a thrust dynamic pressure bearing defined by the upper and lower thrust dynamic pressure bearing portions 821 and 822 in the thrust direction with respect to the upper thrust portion 42 and the outer tubular portion 432.

At this time, each of the upper and lower radial dynamic pressure groove arrays 711 and 712 illustrated in FIG. 5 generates a dynamic pressure by pumping the lubricating oil 45 to a middle portion thereof. As described above, the groove lower portion 711b of the upper radial dynamic pressure groove array 711 is arranged to be shorter than the groove upper portion 711a thereof, while the groove upper portion 712a of the lower radial dynamic pressure groove array 712 is arranged to be shorter than the groove lower portion 712b thereof. The radial dynamic pressure bearing 81 as a whole is arranged to generate little pressure acting on the lubricating oil 45 in the vertical direction.

Meanwhile, in the upper thrust gap 651 illustrated in FIG. 4, a pressure acting on the lubricating oil 45 in the direction of the shaft portion 41 is generated by the upper thrust dynamic pressure bearing portion 821. The pressure on the lubricating oil 45 is thereby increased in an axially upper portion of the radial gap 62 and a radially inner portion of the upper thrust gap 651, whereby generation of an air bubble is prevented therein.

In the lower thrust dynamic pressure bearing portion 822, a pressure acting on the lubricating oil 45 in the direction of the cylindrical gap 64 is generated. The pressure on the lubricating oil 45 is increased in an axially lower portion of the radial gap 62, the lower end gap 63, the cylindrical gap 64, and a radially inner portion of the lower thrust gap 652, whereby generation of an air bubble is prevented in the cylindrical gap 64 and the lower end gap 63. As described above, in the motor 12, a pressure is applied to the lubricating oil 45 throughout an entire circulation channel of the lubricating oil 45 except for the communicating hole 61, so that a sufficient bearing performance of the bearing mechanism 4 is ensured.

Figure 8:
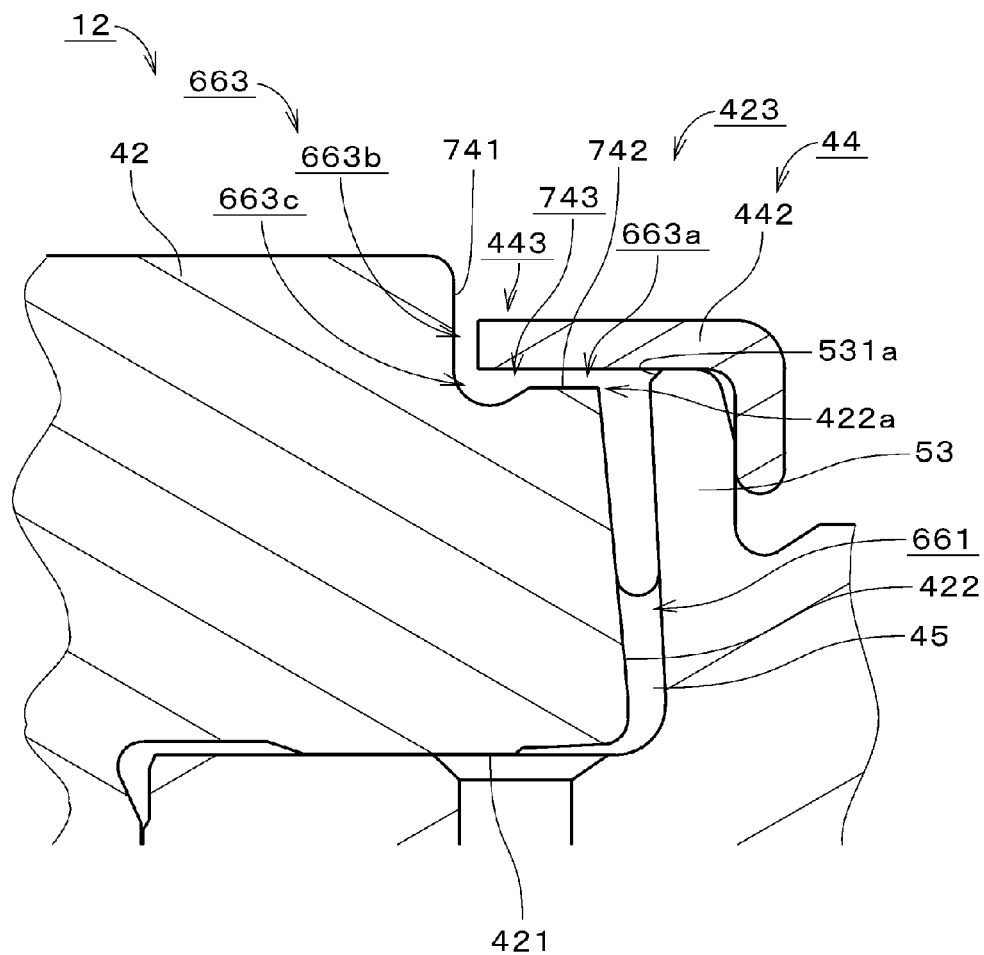
FIG. 8 is a cross-sectional view of the bearing mechanism according to the first preferred embodiment.

Next, the structure of the upper seal gap 661 and its vicinity within the motor 12 will now be described below. Referring to FIG. 8, the shoulder portion 423 of the upper thrust portion 42 preferably includes an inner cylindrical surface 741, an outer annular surface 742, and an annular groove portion 743. The inner cylindrical surface 741 is substantially cylindrical, and is arranged radially inward of the outer circumferential surface 422 to extend in the axial direction. The inner cylindrical surface 741 is arranged radially outward of the radial dynamic pressure bearing 81 illustrated in FIG. 4. An upper end of the inner cylindrical surface 741 is arranged at a level higher than that of an upper end of the outer circumferential surface 422. The outer annular surface 742 is arranged radially outward of the inner cylindrical surface 741, and radially inward of the outer circumferential surface 422. The outer annular surface 742 is an annular surface perpendicular or substantially perpendicular to the central axis J1. The outer annular surface 742 is arranged at an axial level lower than that of the upper end of the inner cylindrical surface 741. The groove portion 743 is arranged between the inner cylindrical surface 741 and the outer annular surface 742. The groove portion 743 is recessed axially downward relative to the outer annular surface 742. Note that the shoulder portion 423 does not cause a significant decrease in rigidity of the upper thrust portion 42 because the upper thrust portion 42 is arranged to have a sufficient thickness between the lower surface 421 and a combination of the outer annular surface 742 and a bottom surface of the groove portion 743.

A radially extending gap 663a, which is annular and arranged to extend radially, is defined between a lower surface of the cap cover portion 442 of the seal cap 44 and the outer annular surface 742. An axially extending gap 663b, which is annular, is defined between a radially inner edge 443 of the cap cover portion 442 and the inner cylindrical surface 741. An upper portion of the upper seal gap 661 is continuous with the radially extending gap 663a. The radially extending gap 663a is continuous with the axially extending gap 663b through a gap 663c defined between the cap cover portion 442 and the groove portion 743. Hereinafter, the gap 663c will be referred to as a "groove portion gap 663c". The axially extending gap 663b is arranged to open into a space above the upper thrust portion 42. The upper seal gap 661 is thus arranged in communication with the space above the upper thrust portion 42 through the radially extending gap 663a, the groove portion gap 663c, and the axially extending gap 663b.

Hereinafter, the radially extending gap 663a, the groove portion gap 663c, and the axially extending gap 663b will be collectively referred to as a "communicating gap 663". The radially extending gap 663a is a region where the communicating gap 663 has a locally decreased axial width. The axially extending gap 663b is a region where the communicating gap 663 has a locally decreased radial width.

The axial width of the radially extending gap 663a is arranged to be smaller than the maximum radial width of the upper seal gap 661. In other words, the axial width of the radially extending gap 663a is arranged to be smaller than the radial distance between an edge 422a where the outer annular surface 742 and the outer circumferential surface 422 meet and an upper edge of a chamfer 531a defined in an inner top portion of the upper hub tubular portion 53. Note that, in the case where a chamfer is defined between the outer annular surface 742 and the outer circumferential surface 422, the maximum radial width of the upper seal gap 661 refers to the radial distance between an upper edge of this chamfer and the upper edge of the chamfer 531a of the upper hub tubular portion 53.

An excessively large axial width of the radially extending gap 663a and an excessively large radial width of the axially extending gap 663b will lead to a significant reduction in an effect of reducing axial and radial flows of air therein. On the other hand, an excessively small axial width of the radially extending gap 663a and an excessively small radial width of the axially extending gap 663b will lead to an increased probability of contacting between the seal cap 44 and the upper thrust portion 42. Therefore, the axial width of the radially extending gap 663a is preferably set at an appropriate value to reduce the axial flow of air therein, and the radial width of the axially extending gap 663b is preferably set at an appropriate value to reduce the radial flow of air therein, and also to prevent a contact of the seal cap 44 with the upper thrust portion 42.

For example, the axial width of the radially extending gap 663a is preferably arranged in the range of about 0.05 mm to about 0.2 mm. Specifically, the axial width of the radially extending gap 663a is more preferably arranged in the range of about 0.05 mm to about 0.1 mm, for example. The radial width of the axially extending gap 663b is preferably arranged in the range of about 0.05 mm to about 0.2 mm, for example. As with the axial width of the radially extending gap 663a, the radial width of the axially extending gap 663b is arranged to be smaller than the maximum radial width of the upper seal gap 661. Moreover, the axial width of the radially extending gap 663a is preferably arranged to be smaller than the radial width of the axially extending gap 663b.

In the motor 12, the communicating gap 663 is arranged to have a labyrinth structure, including a radially extending gap and an axially extending gap, and therefore, an air containing an evaporated lubricating oil in the upper seal gap 661 is prevented from traveling to an outside of the motor 12 therethrough. In particular, because the communicating gap 663 is arranged radially inward of the upper seal gap 661, a centrifugal force acting on an air in the communicating gap 663 in the direction of the upper seal gap 661 is generated while the motor 12 is driven. This contributes to an additional prevention of the travel of the air containing the evaporated lubricating oil to the outside of the motor 12. Note that the motor 12 has an increased resistance against a flow of air in the communicating gap compared with a motor in which a communicating gap in communication with the outside of the motor is arranged radially outward of the seal gap. Furthermore, a circumferential air current is generated in the axially extending gap 663b, and this contributes to preventing air from traveling between the space above the upper thrust portion 42 and the groove portion gap 663c. It is easy to secure a sufficient radial dimension of the radially extending gap 663a in the communicating gap 663. The radially extending gap 663a having a small width and a large radial dimension makes it possible to secure a sufficient resistance against the flow of air therein.

The motor 12 according to the first preferred embodiment has been described above. The provision of the radially extending gap 663a and the axially extending gap 663b in the motor 12 contributes to reducing evaporation of the lubricating oil 45, and achieving an improvement in a life of the motor 12. Because the upper seal portion 661a is arranged in a radially outer portion of the bearing mechanism 4, it is possible to secure a sufficient space to arrange the communicating gap 663 in a radially inner portion of the bearing mechanism 4.

The provision of the groove portion 743 in the shoulder portion 423 of the upper thrust portion 42 makes it possible to arrange the inner edge 443 of the seal cap 44 in closer proximity to the inner cylindrical surface 741, and makes it easier to define the axially extending gap 663b, than in the case where a curved surface smoothly joining the inner cylindrical surface 741 and the outer annular surface 742 to each other is defined instead of the groove portion 743.

In the bearing mechanism 4, the axial distance between the surface of the lubricating oil 45 in the upper seal portion 661a and the surface of the lubricating oil 45 in the lower seal portion 662a is shorter than the axial length of the radial dynamic pressure bearing 81. The axial length of the radial dynamic pressure bearing 81 refers to the distance between an upper end and a lower end of the radial dynamic pressure bearing 81. More specifically, the axial length of the radial dynamic pressure bearing 81 refers to the distance between an upper end of the groove upper portion 711a of the upper radial dynamic pressure groove array 711 and a lower end of the groove lower portion 712b of the lower radial dynamic pressure groove array 712. Note that a portion that does not contribute to the function of the dynamic pressure bearing may exist between the upper and lower ends. The same holds true for other preferred embodiments of the present invention described below. A reduction in a difference in pressure between the upper seal portion 661a and the lower seal portion 662a is achieved by arranging the upper seal portion 661a and the lower seal portion 662a to be closer to each other in the axial direction as described above. This prevents a leakage of the lubricating oil 45.

Moreover, the axial length of the communicating hole is shorter than the axial distance between the upper seal portion 661a and the lower seal portion 662a. This contributes to reducing the amount of the lubricating oil 45 arranged in the communicating hole 61, and at the same time to reducing channel resistance. A reduction in a difference in pressure between the upper and lower seal gaps 661 and 662 owing to influence of channel resistance and gravity acting on the lubricating oil 45 in the communicating hole 61 is achieved. This contributes to reducing movement of the lubricating oil 45 between the upper and lower seal gaps 661 and 662, and further prevents leakage of the lubricating oil 45.

Furthermore, the cylindrical gap 64, which corresponds to the second gap, is arranged to be in communication with a lower portion of the radial gap 62, which corresponds to the first gap, while at the same time the lower thrust gap 652, which corresponds to the third gap, is arranged axially above the lower radial dynamic pressure bearing portion 812. This arrangement makes it possible to arrange the lower thrust gap 652 to be closer to the upper thrust gap 651, making it easier to reduce the length of the communicating hole 61, which is arranged to make the upper and lower thrust gaps 651 and 652 in communication with each other. As a result, the upper seal portion 661a and the lower seal portion 662a are arranged to be closer to each other.

The communicating hole 61 is arranged to extend in parallel or substantially in parallel with the central axis J1 to reduce a difference between the distance from the upper end opening of the communicating hole 61 to the upper seal gap 661 and the distance from the lower end opening of the communicating hole 61 to the lower seal gap 662. This arrangement contributes to further reducing the difference in pressure between the upper and lower seal gaps 661 and 662.

Furthermore, the end opening of each of the upper and lower seal gaps 661 and 662 is arranged to be angled to face the central axis J1. Therefore, during rotation of the motor 12, the lubricating oil 45 is pressed inward in each of the upper and lower seal gaps 661 and 662 through a centrifugal force. This prevents a leakage of the lubricating oil 45. As a result, designing of the motor 12 is made easier.

The upper thrust dynamic pressure groove array 721 is arranged to extend radially outward to such an extent that the outer circumferential portion thereof overlaps with the communicating hole 61 in plan view. As a result, a thrust dynamic pressure is efficiently obtained, and a portion of the flange portion 52 which is close to the outer edge portion thereof is supported by the upper thrust dynamic pressure bearing portion 821. This contributes to more stable support of the sleeve portion 5. The same holds true for the lower thrust dynamic pressure groove array 722.

In the motor 12, the lower thrust gap 652 is arranged in the upper portion of the bearing mechanism 4. Accordingly, a space is secured below the lower thrust gap 652, and the fixing region 436 where the outer tubular portion 432 and the base plate 21 are fixed to each other can be arranged in this space. This enables the fixing region 436 to have a sufficient axial dimension. In the motor 12, a greater axial length of the radial gap 62 is preferred because an increase in the axial length of the radial dynamic pressure bearing 81 can thereby be achieved, and an improvement in rigidity of the bearing mechanism 4 against an external force acting in such a direction as to tilt the rotating portion 3 can also be achieved. The fixing region 436 is arranged to overlap with at least a portion of the lower radial dynamic pressure bearing portion 812 in the radial direction. As a result, both an increase in the axial length of the radial gap 62 and an increase in the axial dimension of the fixing region 436 are achieved. Moreover, an area surrounding a lower portion of the radial dynamic pressure bearing 81 is surrounded by the base plate 21. This results in increased rigidity of the surroundings of the lower portion of the radial dynamic pressure bearing 81. Moreover, a reduction in the thickness of the motor 12 as a whole in a direction parallel or substantially parallel to the central axis J1 is achieved.

Because the shaft portion 41 and the upper thrust portion 42 are preferably defined by a single continuous monolithic member, and because the lower plate portion 431 and the outer tubular portion 432 are preferably defined by a single continuous monolithic member, a reduction in the number of components of the motor 12 and a reduction in the number of steps required to assemble the motor 12 are achieved. It is easy to define the communicating hole 61 in the sleeve portion 5 because the communicating hole 61 is arranged to have a small axial length and to extend in parallel or substantially in parallel with the central axis J1. A reduction in the total amount of the lubricating oil 45 is also achieved. Note that the diameter of the communicating hole 61 may be reduced to as small as the width of the cylindrical gap 64 to achieve an additional reduction in the amount of the lubricating oil 45.

Figure 9:
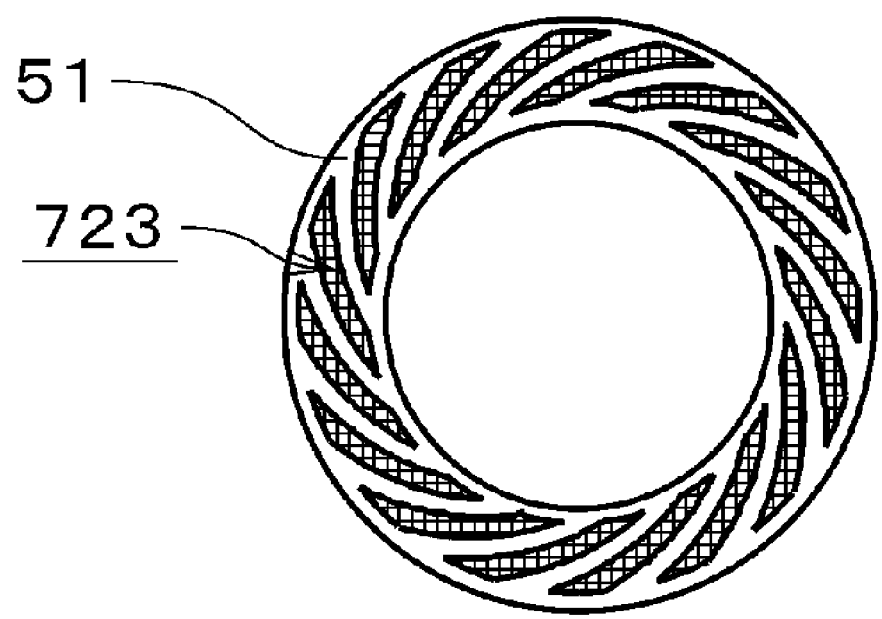
FIG. 9 is a bottom view of an inner tubular portion of a bearing mechanism according to another preferred embodiment of the present invention.

FIG. 9 is a bottom view of the inner tubular portion 51. Referring to FIG. 9, in the motor 12, a lower surface of the inner tubular portion 51 may include a thrust dynamic pressure groove array 723 defined therein. A thrust dynamic pressure bearing portion arranged to support the inner tubular portion 51 in the thrust direction is thereby defined in the lower end gap illustrated in FIG. 3. In this case, a dynamic pressure generation portion that functions as a thrust dynamic pressure bearing portion may not necessarily be arranged in the lower thrust gap 652. Note, however, that it is preferable that a dynamic pressure groove array which defines a dynamic pressure generation portion arranged to induce a radially inward pressure acting on the lubricating oil 45 should be arranged in the lower thrust gap. In the case of the structure illustrated in FIG. 9, the axial width of the lower thrust gap is preferably arranged to be greater than that of the lower end gap. The same holds true for a second preferred embodiment of the present invention described below.

Second Preferred Embodiment

Figure 10:
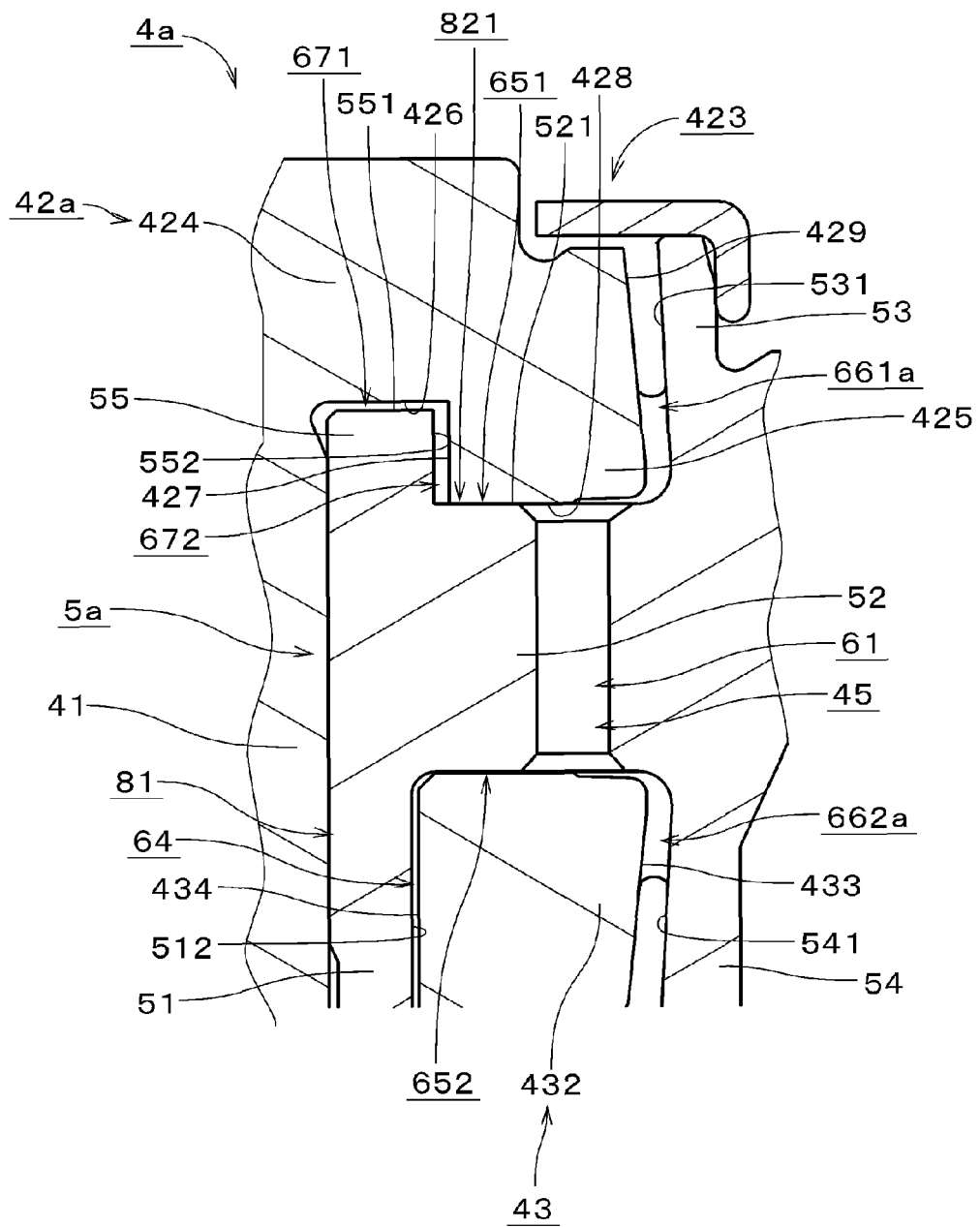
FIG. 10 is a cross-sectional view of a bearing mechanism in a motor according to a second preferred embodiment of the present invention.

FIG. 10 is a diagram illustrating a portion of a bearing mechanism 4a in a motor according to the second preferred embodiment of the present invention. A sleeve portion 5a of the bearing mechanism 4a includes an upper inner tubular portion 55. The upper inner tubular portion 55 is annular and arranged to extend axially upward from a radially inner portion of the flange portion 52. Hereinafter, the inner tubular portion 51, which is arranged below the flange portion 52, will be referred to as a "lower inner tubular portion 51" when the inner tubular portion 51 is distinguished from the upper inner tubular portion 55. An upper thrust portion 42a includes an upper plate portion 424 and an upper outer tubular portion 425. The upper plate portion 424 is arranged to extend radially outward from the upper portion of the shaft portion 41. The upper outer tubular portion 425 is arranged to extend downward from an outer edge portion of the upper plate portion 424. Hereinafter, the plate portion 431 of the lower thrust portion 43 will be referred to as a "lower plate portion 431" when the plate portion 431 is distinguished from the upper plate portion 424. The outer tubular portion 432 will be referred to as a "lower outer tubular portion 432" when the outer tubular portion 432 is distinguished from the upper outer tubular portion 425. The bearing mechanism 4a is otherwise similar in structure to the bearing mechanism 4 in the motor 12 according to the first preferred embodiment of the present invention. Note that like members or portions are designated by like reference numerals in the following description.

The upper thrust portion 42a includes the shoulder portion 423 recessed axially downward and defined between an upper surface of the upper plate portion 424 and an outer circumferential surface 429 of the upper outer tubular portion 425. While some of the reference symbols shown in FIG. 8 are omitted in FIG. 10, the radially extending gap 663a is defined between the outer annular surface 742 of the shoulder portion 423 and the lower surface of the cap cover portion 442 as in FIG. 8. In addition, the axially extending gap 663b is defined between the inner cylindrical surface 741 and the inner edge 443 of the cap cover portion 442. Thus, as in the first preferred embodiment, a reduction in the evaporation of the lubricating oil 45 through the upper seal portion 661a, and an improvement in the life of the motor are achieved.

Referring to FIG. 10, a gap 671 is defined between an upper surface 551 of the upper inner tubular portion 55 and a lower surface 426 of the upper plate portion 424 in the axial direction, i.e., in the vertical direction in FIG. 10. Hereinafter, the gap 671 will be referred to as an "upper end gap 671". In addition, a cylindrical gap 672 is defined between an outer circumferential surface 552 of the upper inner tubular portion 55 and an inner circumferential surface 427 of the upper outer tubular portion 425 in the radial direction. Hereinafter, the gap 672 will be referred to as an "upper cylindrical gap 672". Hereinafter, the cylindrical gap 64, which is defined between the outer circumferential surface 512 of the lower inner tubular portion 51 and the inner circumferential surface 434 of the lower outer tubular portion 432, will be referred to as a "lower cylindrical gap 64" when the cylindrical gap 64 is distinguished from the upper cylindrical gap 672.

An upper thrust dynamic pressure groove array 721 similar to that illustrated in FIG. 6 is defined in a lower surface 428 of the upper outer tubular portion 425 of the upper thrust portion 42a. As a result, the upper thrust dynamic pressure bearing portion 821 is defined in the upper thrust gap 651 between the lower surface 428 of the upper outer tubular portion 425 and the upper surface 521 of the flange portion 52. In the bearing mechanism 4a, the upper thrust dynamic pressure bearing portion 821 and the radial dynamic pressure bearing 81 are arranged in communication with each other through the upper cylindrical gap 672 and the upper end gap 671.

The upper seal portion 661a is defined between the outer circumferential surface 429 of the upper outer tubular portion 425 and the inner circumferential surface 531 of the upper hub tubular portion 53. The lower seal portion 662a is defined between the inclined surface 433 of the lower outer tubular portion 432 and the inner circumferential surface 541 of the lower hub tubular portion 54. The upper seal portion 661a and the lower seal portion 662a are arranged in communication with each other through the communicating hole 61. The axial distance between the upper end of the surface of the lubricating oil 45 in the upper seal portion 661a and the lower end of the surface of the lubricating oil 45 in the lower seal portion 662a is preferably longer than the length of the communicating hole and shorter than the length of the radial dynamic pressure bearing 81.

Also in the second preferred embodiment of the present invention, the axial distance between the surface of the lubricating oil 45 in the upper seal portion 661a and the surface of the lubricating oil 45 in the lower seal portion 662a is shorter than the length of the radial dynamic pressure bearing 81. This arrangement contributes to reducing the difference in pressure between the upper and lower seal portions 661a and 662a. This contributes to preventing a leakage of the lubricating oil 45. Furthermore, the length of the communicating hole 61 being shorter than the distance between the upper seal portion 661a and the lower seal portion 662a makes it easier to prevent any leakage of the lubricating oil 45.

Providing the upper cylindrical gap 672 and the lower cylindrical gap 64 contributes to reducing the length of the communicating hole 61. The reduced length of the communicating hole 61 contributes to arranging the upper seal portion 661a and the lower seal portion 662a to be closer to each other, whereby a leakage of the lubricating oil 45 is more easily prevented. Moreover, the upper end gap 671 and the upper cylindrical gap 672 are arranged between the upper thrust dynamic pressure bearing portion 821 and the radial dynamic pressure bearing 81. This arrangement contributes to increased pressure on the lubricating oil 45 in the upper end gap 671 and the upper cylindrical gap 672, whereby generation of an air bubble is prevented therein.

In the bearing mechanism 4a, the upper surface 551 of the upper inner tubular portion 55 may include a thrust dynamic pressure groove array similar to the thrust dynamic pressure groove array 723 illustrated in FIG. 9 defined therein. This results in a thrust dynamic pressure bearing portion being defined in the upper end gap 671 to support the upper inner tubular portion 55 in the thrust direction. In this case, a dynamic pressure generation portion that functions as an upper thrust dynamic pressure bearing portion may not necessarily be arranged in the upper thrust gap 651. Note, however, that it is preferable that a dynamic pressure groove array which defines a dynamic pressure generation portion arranged to produce a radially inward pressure acting on the lubricating oil 45 should be arranged in the upper thrust gap 651. The axial width of the upper end gap 671 is preferably greater than that of the upper thrust gap 651.

Third Preferred Embodiment

Figure 11:
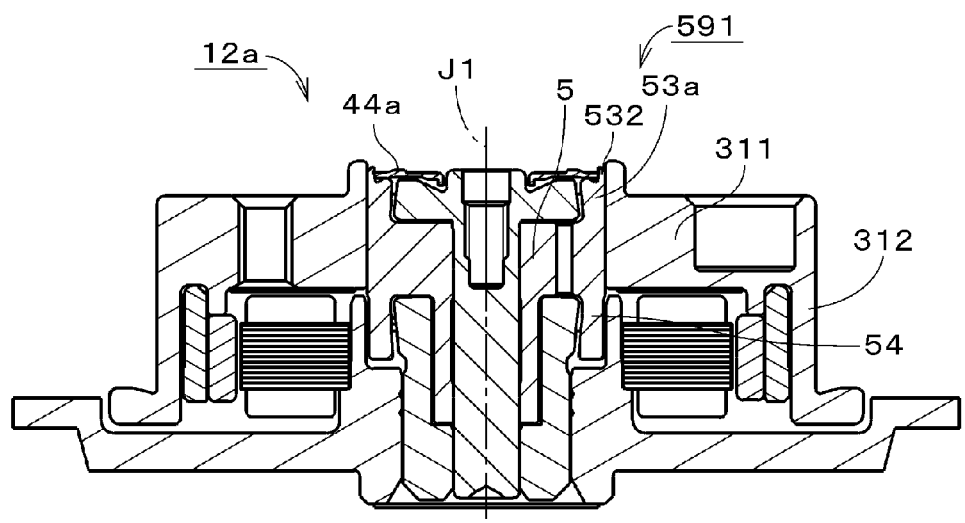
FIG. 11 is a cross-sectional view of a motor according to a third preferred embodiment of the present invention.

FIG. 11 is a diagram illustrates a motor 12*a* according to a third preferred embodiment of the present invention. In the motor 12*a*, the sleeve portion 5, an upper hub tubular portion 53*a*, and the lower hub tubular portion 54 are preferably defined by a single continuous monolithic member. In addition, the cover portion 311 and the cylindrical portion 312 are preferably defined by a single continuous monolithic member. The upper hub tubular portion 53*a* includes an annular projecting portion 532 arranged to project upward. A seal cap 44*a* is arranged to be annular and centered on the central axis J1. In the motor 12*a*, the upper hub tubular portion 53*a* defines the tubular portion of the upper hub annular portion 591. In addition, the seal cap 44*a* defines the annular cover portion of the upper hub annular portion 591. The motor 12*a* is otherwise substantially similar in structure to the motor 12 according to the first preferred embodiment of the present invention.

Figure 12:
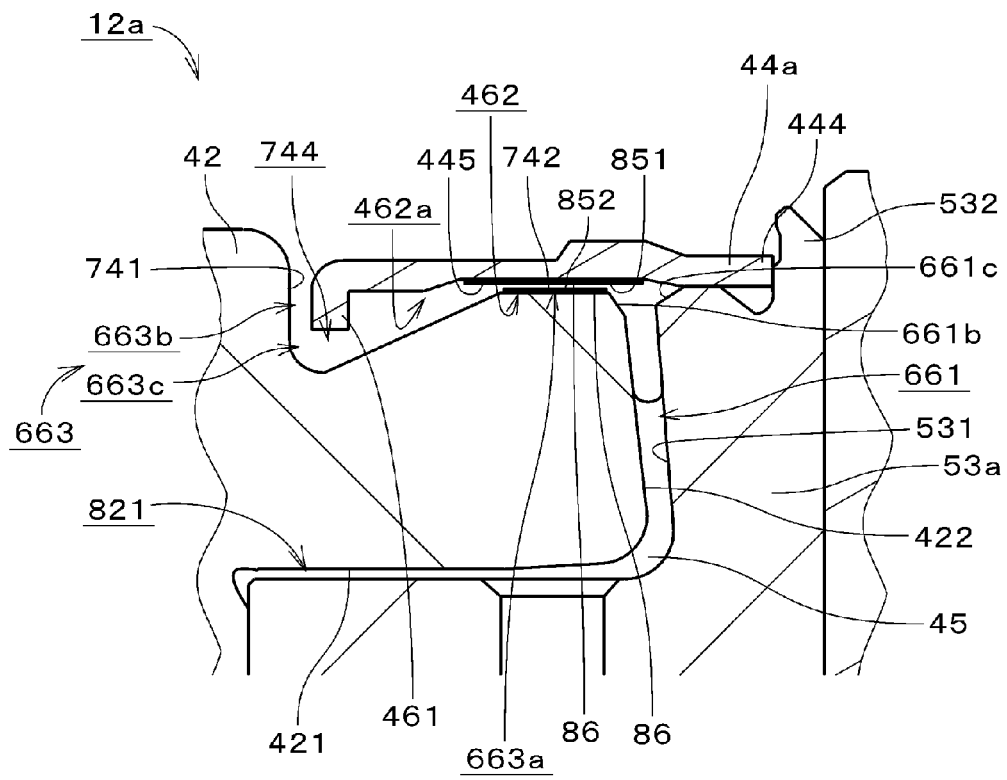
FIG. 12 is a cross-sectional view of a bearing mechanism according to the third preferred embodiment.

Referring to FIG. 12, in the motor 12*a*, a radially outer edge 444 of the seal cap 44*a* is tightly fitted to an inner circumferential surface of the projecting portion 532. Note that the outer edge 444 may be fixed to the upper hub tubular portion 53*a* preferably through, for example, an adhesive. Also note that the outer edge 444 may be fixed to the upper hub tubular portion 53*a* through, for example, a combination of the tight fit and use of the adhesive, if so desired.

Figure 13:
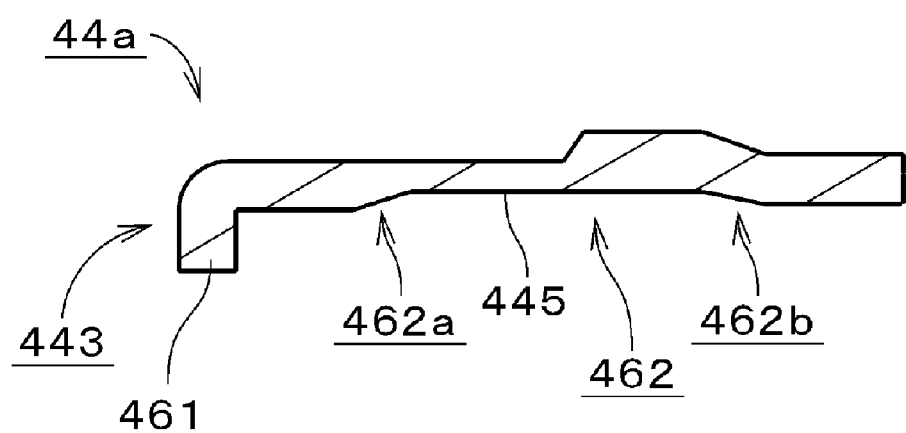
FIG. 13 is a cross-sectional view of a seal cap according to the third preferred embodiment.
Figure 14:
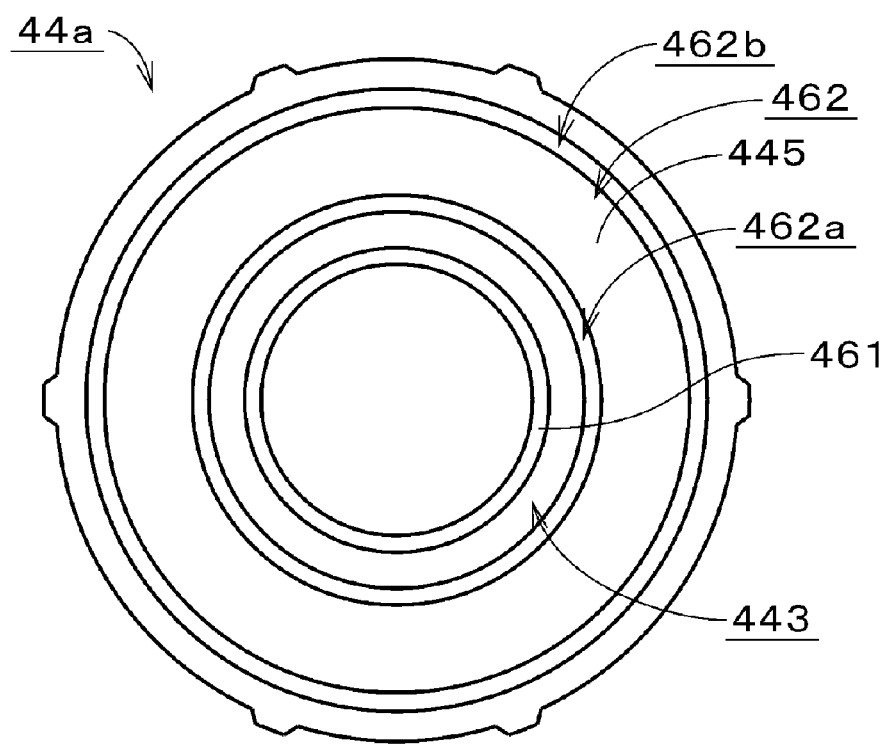
FIG. 14 is a bottom view of the seal cap according to the third preferred embodiment.

FIG. 13 is a cross-sectional view of the seal cap 44*a*. FIG. 14 is a bottom view of the seal cap 44*a*. The inner edge 443 of the seal cap 44*a* preferably includes an inner annular projecting portion 461 arranged to project downward. A lower surface of the seal cap 44*a* includes a recessed portion 462 recessed upward. The depth of the recessed portion 462 is preferably arranged in the range of about 10 μm to about 50 μm, for example. Referring to FIG. 12, the upper thrust portion 42 includes a groove portion 744 having a great depth and defined between the inner cylindrical surface 741, which is arranged radially inward of the outer circumferential surface 422, and the outer annular surface 742, which is arranged radially outward of the inner cylindrical surface 741. The upper end of the inner cylindrical surface 741 is arranged at an axial level higher than that of the upper end of the outer circumferential surface 422 and that of the outer annular surface 742.

A lower end of the inner annular projecting portion 461 of the seal cap 44*a* is arranged inside the groove portion 744. The radially extending gap 663*a*, which is annular and arranged to extend perpendicularly or substantially perpendicularly to the central axis J1, is defined between a bottom surface 445 of the recessed portion 462, which is perpendicular or substantially perpendicular to the central axis J1, and the outer annular surface 742 of the upper thrust portion 42.

The axial width of the radially extending gap 663*a* is arranged to be smaller than the maximum radial width of the upper seal gap 661. In other words, the axial width of the radially extending gap 663*a* is arranged to be smaller than the radial distance between an upper edge of a chamfer 661*b* defined between the outer annular surface 742 and the outer circumferential surface 422 and an upper edge of a chamfer 661*c* defined at an inner top portion of the upper hub tubular portion 53*a*. Note that, in the case where the upper thrust portion 42 and the upper hub tubular portion 53*a* are not provided with the chamfers 661*b* and 661*c*, respectively, in the upper portion of the upper seal gap 661, the maximum radial width of the upper seal gap 661 refers to the radial distance between an upper edge of the outer circumferential surface 422 and an upper edge of the inner circumferential surface 531 of the upper hub tubular portion 53*a*.

The axial width of the radially extending gap 663*a* is preferably arranged in the range of about 0.05 mm to about 0.2 mm, for example. The radially extending gap 663*a* is continuous with the upper portion of the upper seal gap 661. Each of the outer annular surface 742 and the bottom surface 445 of the recessed portion 462 is coated with an oil-repellent agent about its entire circumference. Hereinafter, an annular region that surrounds the central axis J1 and which is coated with an oil-repellent film 86 on the bottom surface 445 of the recessed portion 462 of the seal cap 44*a* will be referred to as a "first oil-repellent film region 851". An annular region that surrounds the central axis J1 and which is coated with an oil-repellent film 86 on the outer annular surface 742 will be referred to as a "second oil-repellent film region 852".

A strong physical shock to the motor 12*a* may cause droplets of the lubricating oil 45 in the upper seal gap 661 to be scattered, so that some of the droplets may be adhered to the lower surface of the seal cap 44*a* or the outer annular surface 742. Provision of the first and second oil-repellent film regions 851 and 852 in the motor 12*a* contributes to prevention of the droplets of the lubricating oil 45 from traveling radially inward on the lower surface of the seal cap 44*a* or the outer annular surface 742. The lubricating oil 45 is thus prevented from traveling through the radially extending gap 663*a* to be leaked out of the motor 12*a*. In other words, the lubricating oil 45 is prevented from traveling radially inward beyond the first and second oil-repellent film regions 851 and 852. Moreover, the provision of the first oil-repellent film region 851 and the second oil-repellent film region 852 contributes to more effective prevention of a leakage of the lubricating oil 45 out of the upper seal gap 661. Furthermore, because the radially extending gap 663*a* is a minute gap, the provision of at least one of the first oil-repellent film region 851 and the second oil-repellent film region 852 reduces the leakage of the lubricating oil 45 out of the upper seal gap 661.

Referring to FIGS. 13 and 14, the lower surface of the seal cap 44*a* includes shoulder portions 462*a* and 462*b*. The shoulder portion 462*a* is annular and arranged to extend radially inward from the bottom surface 445 while extending downward. The shoulder portion 462*b* is annular and arranged to extend radially outward from the bottom surface 445 while extending downward. As illustrated in FIG. 12, the shoulder portion 462*a*, which is arranged radially inward of the bottom surface 445, is arranged radially inward of the radially extending gap 663*a*. It is possible to use the shoulder portions 462*a* and 462*b* illustrated in FIGS. 13 and 14 as marks to properly apply the oil-repellent agent onto the bottom surface 445 of the seal cap 44*a*. Note that, if so desired, the oil-repellent agent may be applied to the shoulder portions 462*a* and 462*b* as well.

As illustrated in FIG. 12, the axially extending gap 663b, which is arranged to open into the space above the upper thrust portion 42, is defined between the inner annular projecting portion 461 and the inner cylindrical surface 741. The radial width of the axially extending gap 663b is preferably arranged in the range of about 0.05 mm to about 0.2 mm, for example. The radially extending gap 663a is arranged in communication with the axially extending gap 663b through the groove portion gap 663c, which is defined between the groove portion 744 and the seal cap 44a. In the motor 12a, the communicating gap 663, which is arranged to communicate the upper seal gap 661 with the space above the upper thrust portion 42, is defined by the radially extending gap 663a, the groove portion gap 663c, and the axially extending gap 663b.

Also in the third preferred embodiment of the present invention, the inclusion of the radially extending gap 663a and the axially extending gap 663b in the communicating gap 663 contributes to preventing an air containing an evaporated lubricating oil in the upper seal gap 661 from traveling to the outside of the motor 12a. This contributes to reducing the evaporation of the lubricating oil 45, and thereby achieving an improvement in a usable life of the motor 12a. Moreover, because the lower end of the inner annular projecting portion 461 is arranged inside the groove portion 744, a further reduction in the evaporation of the lubricating oil 45 is achieved. The same holds true for similar structures in other preferred embodiments described below.

The provision of the groove portion 744 in the upper thrust portion 42 makes it possible to arrange the inner annular projecting portion 461 in close proximity to the inner cylindrical surface 741. Thus, the axially extending gap 663b can be easily defined. The provision of the inner annular projecting portion 461 in the seal cap 44a contributes to an increased axial dimension of the axially extending gap 663b, and also to an increased rigidity of the seal cap 44a. In particular, because flexural strength of the seal cap 44a is thereby improved, the seal cap 44a is prevented from undergoing a deformation when the seal cap 44a is, for example, press fitted to be thereby fixed to the projecting portion 532. The motor 12a is able to achieve a reduction in the axial thickness of the seal cap 44a, and a reduction in the total size of the motor 12a. Regarding a storage disk drive including the motor 12a, when the upper plate member 142 of the housing 14 as illustrated in FIG. 1 is fixed to the motor 12a, a strong force may be applied to the upper thrust portion 42. Even if that happens, the force is absorbed by bending of the inner cylindrical surface 741 and the groove portion 744, and the lower surface 421 of the upper thrust portion 42 is prevented from undergoing a substantial deformation. As a result, a reduction in performance of the upper thrust dynamic pressure bearing portion 821 is substantially prevented.

Figure 15:
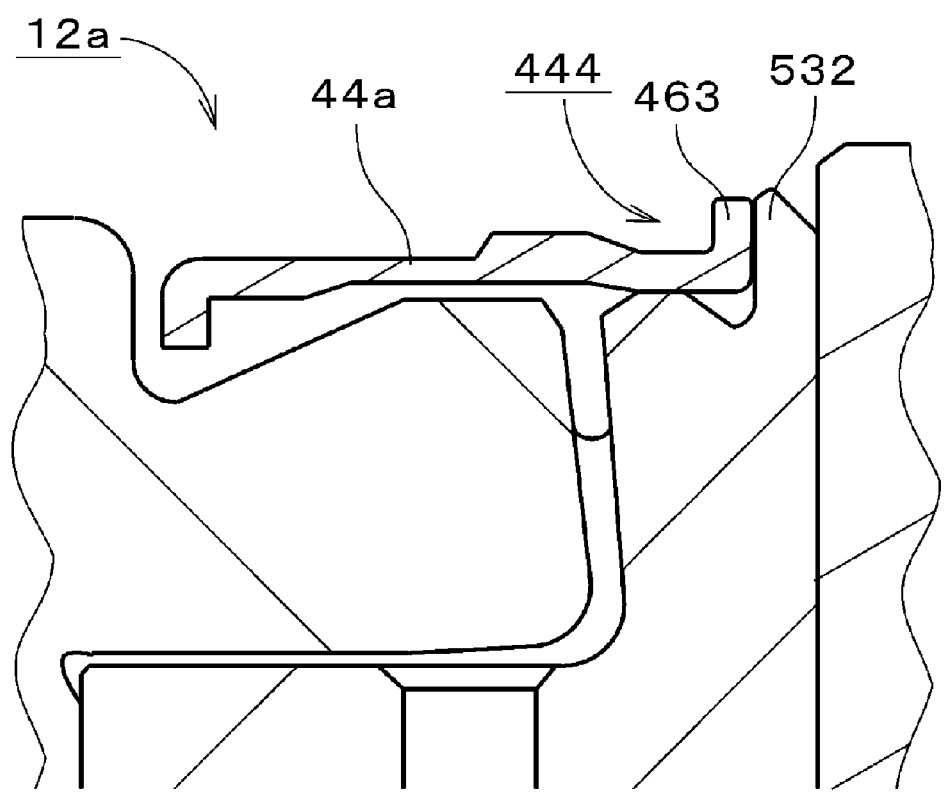
FIG. 15 is a diagram illustrating a seal cap according to another preferred embodiment of the present invention.

FIG. 15 is a diagram illustrating a portion of a motor 12a according to another preferred embodiment of the present invention. The radially outer edge 444 of the seal cap 44a of the motor 12a includes an outer annular projecting portion 463 arranged to project upward. An outer circumferential surface of the outer annular projecting portion 463 is tightly fitted and thereby fixed to the projecting portion 532. The inclusion of the outer annular projecting portion 463 in the seal cap 44a contributes to an increase in an area where the seal cap 44a is in direct contact with the projecting portion 532. The increase in the contact area contributes to an improvement in strength with which the seal cap 44a is, for example, press fitted to the projecting portion 532. Note that, in the case where the outer annular projecting portion 463 and the projecting portion 532 are fixed to each other through, for example, an adhesive, an improvement in adhesive strength therebetween is achieved.

Figure 16:
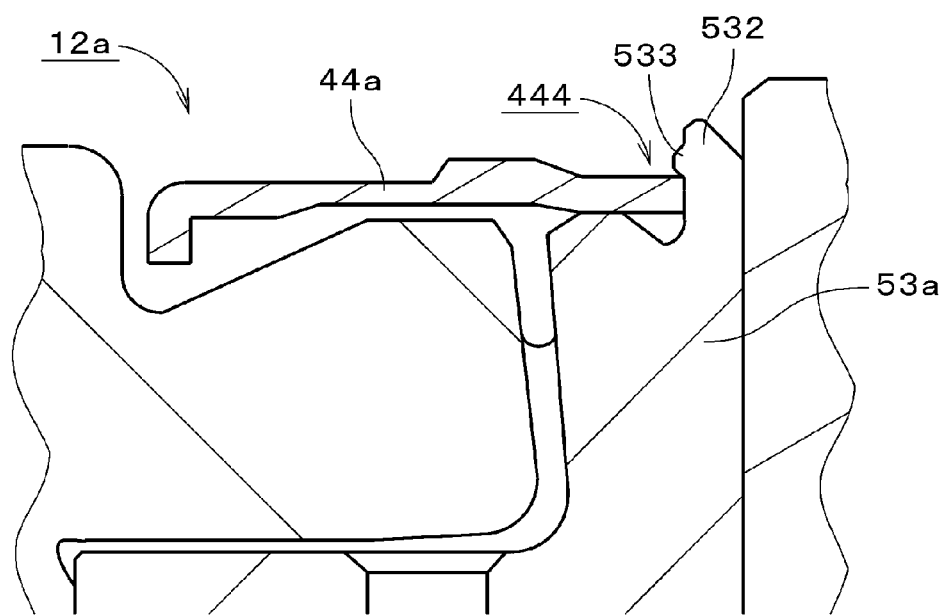
FIG. 16 is a diagram illustrating an upper hub tubular portion according to another preferred embodiment of the present invention.

FIG. 16 is a diagram illustrating a motor 12a according to yet another preferred embodiment of the present invention. The projecting portion 532 of the upper hub tubular portion 53a includes a raised portion 533 that is raised radially inward. In the motor 12a, an upper edge of the outer edge 444 of seal cap 44a and the raised portion 533 are arranged in contact with each other in the axial direction. This contributes to more effectively preventing the seal cap 44a from coming off the upper hub tubular portion 53a. When the seal cap 44a is fixed to the upper hub tubular portion 53a, the outer edge 444 of the seal cap 44a is moved downward while undergoing an upward elastic deformation when being in contact with the raised portion 533, and once the outer edge 444 is moved downward beyond the raised portion 533, the outer edge 444 regains its original shape thanks to resilience.

Figure 17:
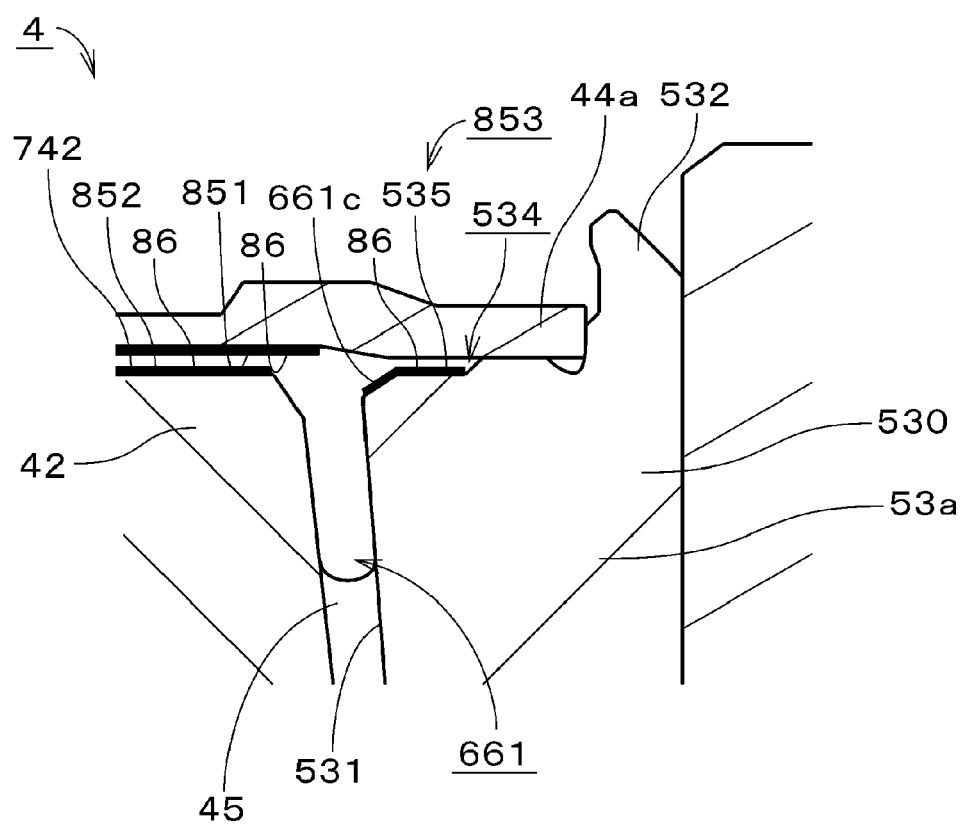
FIG. 17 is a diagram illustrating an upper hub tubular portion according to yet another preferred embodiment of the present invention.

FIG. 17 is a diagram illustrating the upper seal gap 661 and its vicinity of a motor according to yet another preferred embodiment of the present invention. An upper portion 530 of the upper hub tubular portion 53a includes a shoulder portion 534. The shoulder portion 534 is arranged in a region that is radially inward of the projecting portion 532 and which is axially opposed to the seal cap 44a, and is arranged to extend radially outward while extending upward. In the upper portion 530 of the upper hub tubular portion 53a, the shoulder portion 534, an inner annular surface 535, which is annular and centered on the central axis J1 and which is arranged radially inward of the shoulder portion 534, and the chamfer 661c are coated with an oil-repellent film 86 throughout their entire circumference. Hereinafter, the shoulder portion 534, the inner annular surface 535, and the chamfer 661c will be collectively referred to as a "third oil-repellent film region 853". In addition, as in the case of FIG. 12, the lower surface of the seal cap 44a and the outer annular surface 742 of the upper thrust portion 42 are provided with the first and second oil-repellent film regions 851 and 852, respectively.

Providing the third oil-repellent film region 853, which is annular and arranged to surround the central axis J1, in the upper portion 530 of the upper hub tubular portion 53a contributes to preventing a leakage of the lubricating oil 45 due to a centrifugal force when the rotation of the motor 12 is examined before the attachment of the seal cap 44a. It is possible to use the shoulder portion 534 as a mark to properly apply the oil-repellent agent onto the inner annular surface 535 and the chamfer 661c of the upper hub tubular portion 53a.

Moreover, when the lubricating oil 45 is injected into the bearing mechanism 4 through the lower seal gap 662 illustrated in FIG. 4 with the bearing mechanism 4 turned upside down, the provision of the second and third oil-repellent film regions 852 and 853 contributes to preventing a portion of the lubricating oil 45 which has flowed into the upper seal gap 661 from traveling beyond the outer annular surface 742 of the upper thrust portion 42 or the upper portion 530 of the upper hub tubular portion 53a.

Note that, in the bearing mechanism 4, the position of the third oil-repellent film region 853 may be modified appropriately as long as at least a portion of the third oil-repellent film region 853 is arranged radially inward of the shoulder portion 534. For example, an upper portion of the inner circumferential surface 531 may define a portion of the third oil-repellent film region. Also note that the oil-repellent film 86 may not necessarily be arranged to extend over the shoulder portion 534, but the third oil-repellent film region may be arranged to extend over only the inner annular surface 535, the chamfer 661c, and the upper portion of the inner circumferential surface 531. Also note that the third oil-repellent film region may be arranged to extend over only the inner annular surface 535, and that the third oil-repellent film region may be arranged to extend over only the chamfer 661c.

Fourth Preferred Embodiment

Figure 18:
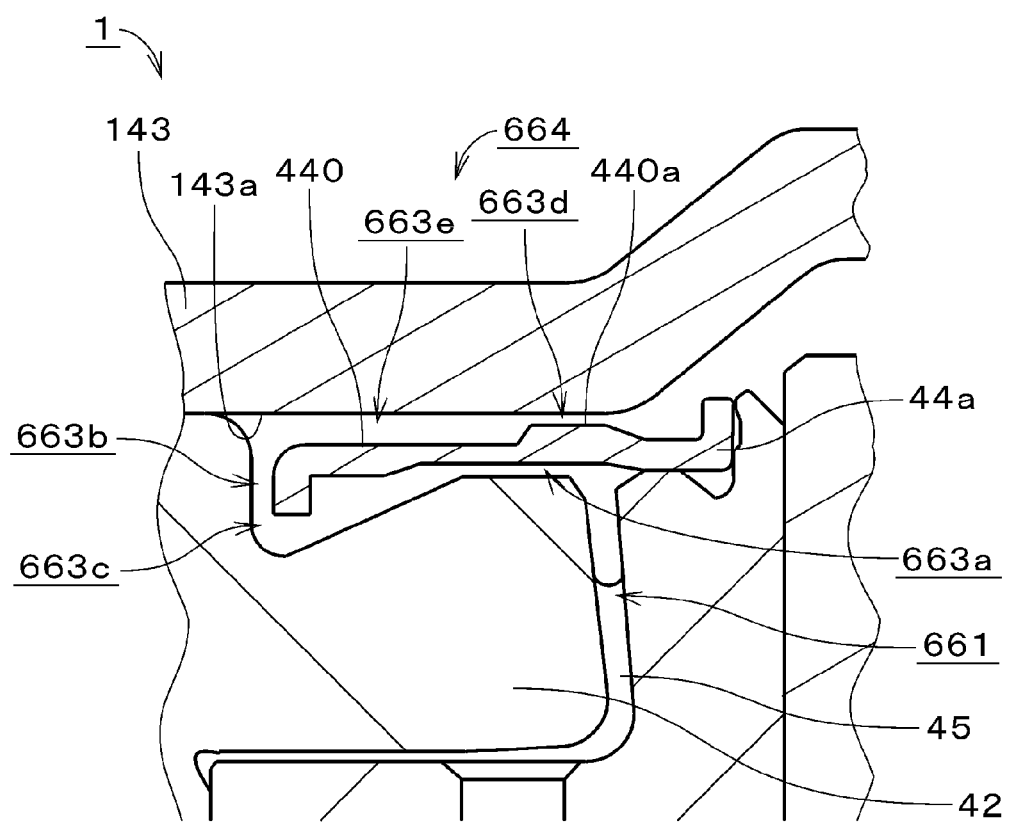
FIG. 18 is a cross-sectional view of a storage disk drive according to a fourth preferred embodiment of the present invention.

FIG. 18 is a diagram illustrating a portion of a storage disk drive 1 including a motor according to a fourth preferred embodiment of the present invention. The structure of this motor is similar to that of the motor 12a illustrated in FIG. 11. An upper surface 440 of the seal cap 44a according to the present preferred embodiment includes a surface 440a that is arranged at an axial level higher than that of a surrounding area and which is arranged axially opposite an outer edge portion of a lower surface 143a of the plate central portion 143 of the housing. Note that the upper surface 440 refers to a surface whose normal is pointed axially upward. In the storage disk drive 1, an annular, radially extending gap 663d is defined between the surface 440a and the lower surface 143a of the plate central portion 143. Hereinafter, the radially extending gap 663a, which is defined between the seal cap 44a and the upper thrust portion 42 will be referred to as a "first radially extending gap 663a", while the gap 663d will be referred to as a "second radially extending gap 663d". The axial width of the second radially extending gap 663d is preferably arranged in the range of about 0.05 mm to about 0.2 mm, for example. The second radially extending gap 663d is arranged in communication with the axially extending gap 663b through a gap 663e defined between the lower surface 143a of the plate central portion 143 and a radially inner portion of the upper surface 440 of the seal cap 44a. Note that the axial width of the gap 663e is also preferably arranged in the range of about 0.05 mm to about 0.2 mm, for example.

In the storage disk drive 1, a communicating gap 664 arranged to bring the upper seal gap 661 into communication with the space outside the motor includes the first radially extending gap 663a, the groove portion gap 663c, the axially extending gap 663b, the gap 663e, and the second radially extending gap 663d. As is the case with the first radially extending gap 663a and the axially extending gap 663b, the second radially extending gap 663d is a region that has a locally decreased width within the communicating gap 664 and which has a width smaller than the maximum radial width of the upper seal gap 661.

Also in the fourth preferred embodiment, a reduction in the evaporation of the lubricating oil 45 is achieved because the communicating gap 664 is arranged to have a labyrinth structure, including radially extending gaps and an axially extending gap. The provision of the second radially extending gap 663d, which has a decreased axial width, contributes to an additional reduction in the evaporation of the lubricating oil 45.

Figure 19:
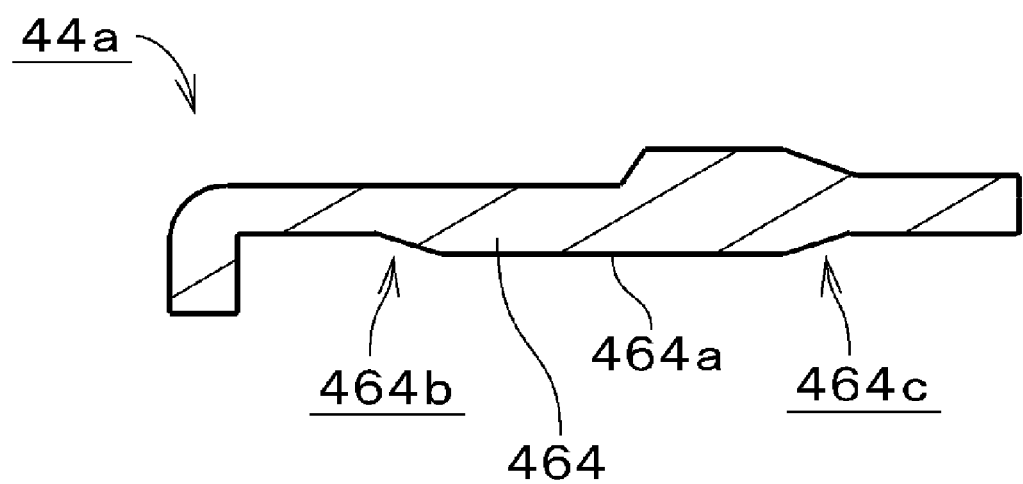
FIG. 19 is a diagram illustrating a seal cap according to yet another preferred embodiment of the present invention.

While preferred embodiments of the present invention have been described above, the present invention is not limited to the above-described preferred embodiments, but a variety of modifications are possible. For example, referring to FIG. 19, in a modification of the third preferred embodiment, the lower surface of the seal cap 44a may include an annular raised portion 464 arranged to project downward. In this case, an oil-repellent agent is applied onto a surface 464a of the raised portion 464 which is perpendicular to the central axis J1. The seal cap 44a includes an annular shoulder portion 464b arranged to extend radially inward from the surface 464a while extending upward, and an annular shoulder portion 464c arranged to extend radially outward from the surface 464a while extending upward. It is possible to use the shoulder portions 464b and 464c as marks for proper application of the oil-repellent agent.

Figure 20:
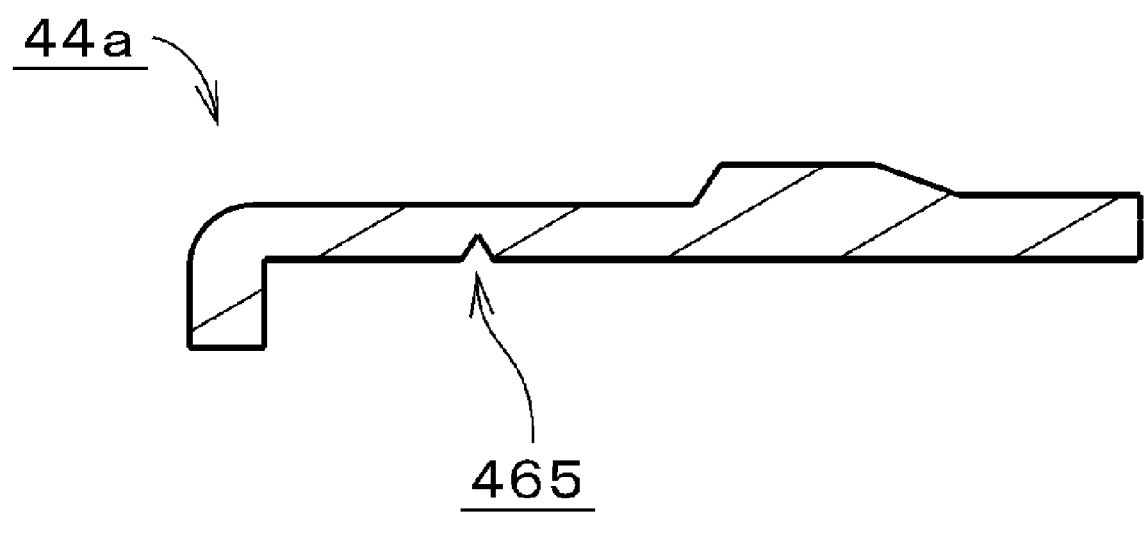
FIG. 20 is a diagram illustrating a seal cap according to yet another preferred embodiment of the present invention.

The region where the oil-repellent agent is to be applied is made easily identifiable by arranging a portion of the lower surface of the seal cap 44a which is radially inward of the radially extending gap 663a at a level higher or lower than that of a portion of the lower surface of the seal cap 44a which defines the radially extending gap 663a. Furthermore, referring to FIG. 20, the lower surface of the seal cap 44a may include a minute recessed portion 465 defined by an annular cut. The minute recessed portion 465 is arranged radially inward of the radially extending gap 663a illustrated in FIG. 12. The oil-repellent agent is applied onto a portion of the lower surface of the seal cap 44a which is radially outward of the minute recessed portion 465. Alternatively, the lower surface of the seal cap 44a may include an annular, minute raised portion.

As described above, the provision of an annular shoulder portion extending upward or downward while extending radially inward in at least a portion of the lower surface of the seal cap 44a which is radially inward of the radially extending gap 663a makes it easier to properly apply the oil-repellent agent onto a portion of the lower surface of the seal cap 44a which is radially outward of the shoulder portion. The same holds true for the first radially extending gap 663a illustrated in FIG. 18. Regarding the upper hub tubular portion 53a illustrated in FIG. 12, the third oil-repellent film region 853 may be arranged in the chamfer 661c, which is arranged in the vicinity of an upper end opening of the upper seal gap 661, and an area surrounding the chamfer 661c, unless the oil-repellent film 86 applied thereto affects the attachment of the seal cap 44a. In each of the first, second, and fourth preferred embodiments, as well as in the third preferred embodiment, the first and second oil-repellent film regions may be arranged in the lower surface of the seal cap 44 or 44a and the outer annular surface 742 of the upper thrust portion 42 or 42a, respectively. The third oil-repellent film region may be arranged in the upper portion of the upper hub tubular portion 53 or 53a.

Figure 21:
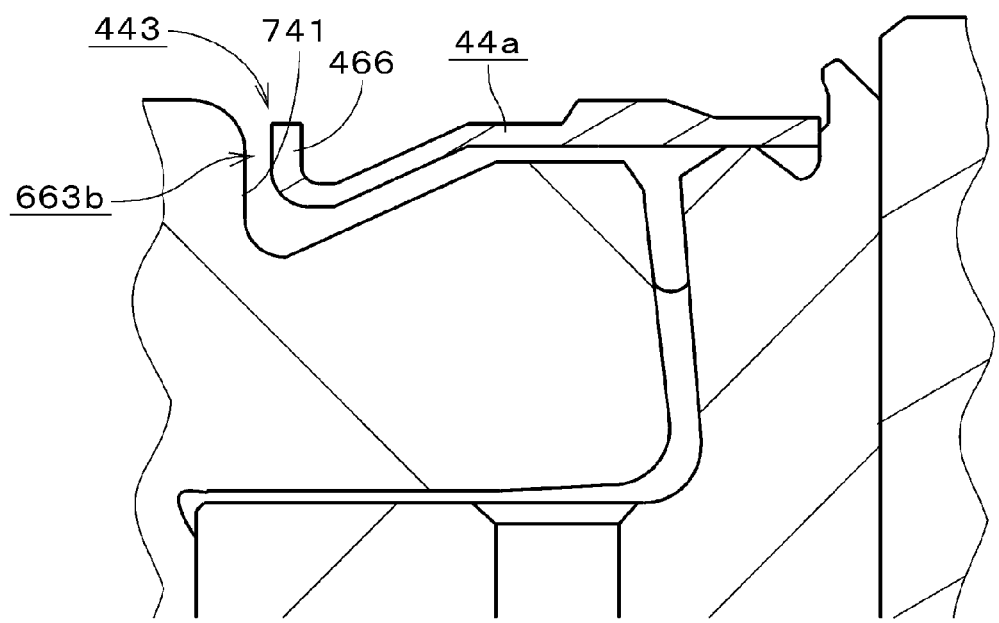
FIG. 21 is a diagram illustrating a seal cap according to yet another preferred embodiment of the present invention.

Referring to FIG. 21, in a modification of the third preferred embodiment, an inner annular projecting portion 466 projecting upward may be arranged at the inner edge 443 of the seal cap 44a such that the axially extending gap 663b is defined between the inner annular projecting portion 466 and the inner cylindrical surface 741. The inner edge 443 including an annular projecting portion arranged to project in the axial direction makes it easier to secure a sufficient length of the axially extending gap 663b while securing a sufficient rigidity of the seal cap 44a.

Figure 22:
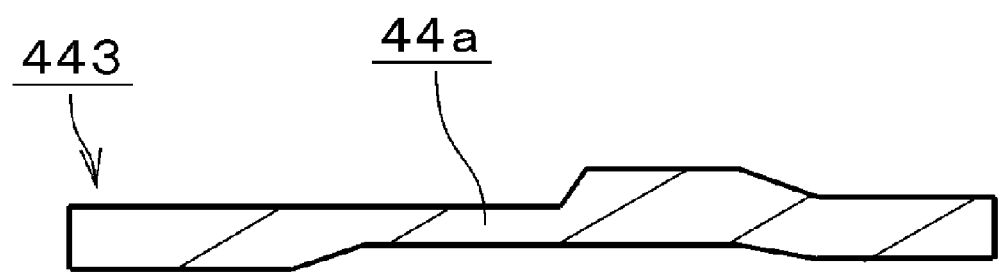
FIG. 22 is a diagram illustrating a seal cap according to yet another preferred embodiment of the present invention.
Figure 23:
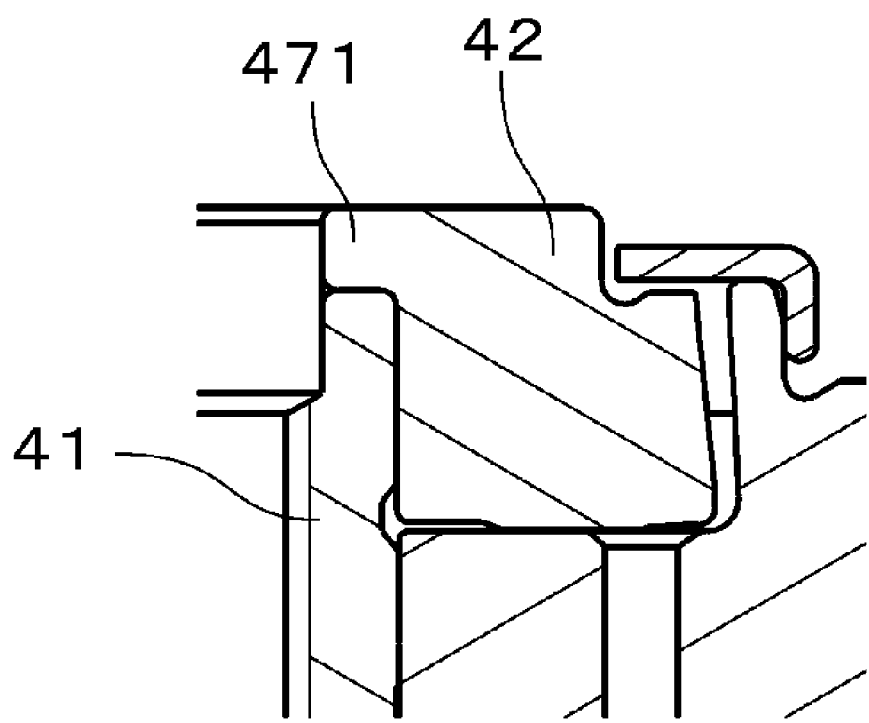
FIG. 23 is a diagram illustrating a shaft portion and an upper thrust portion according to another preferred embodiment of the present invention.
Figure 24:
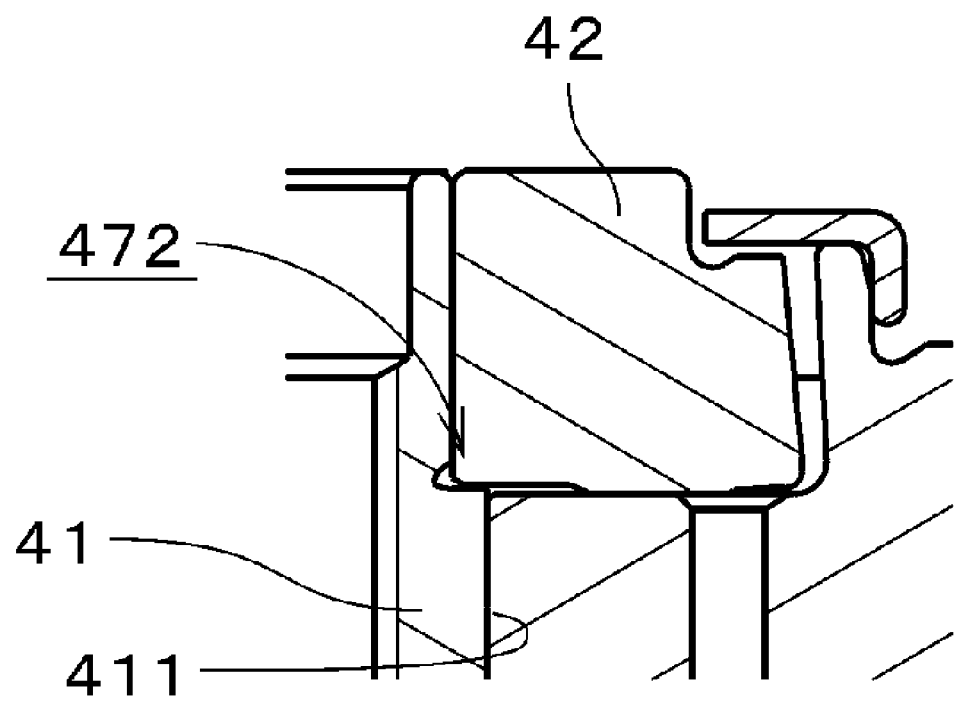
FIG. 24 is a diagram illustrating a shaft portion and an upper thrust portion according to yet another preferred embodiment of the present invention.

Referring to FIG. 22, the inner edge 443 of the seal cap 44a may be arranged to extend perpendicularly or substantially perpendicularly to the central axis J1. Even in this case, it is possible to define a radially extending gap having a large radial dimension below the seal cap 44a, and thereby reduce the evaporation of the lubricating oil 45. Referring to FIG. 23, in a modification of the first preferred embodiment, the upper thrust portion 42 and the shaft portion 41 may be defined by separate members. In this case, the shaft portion 41 is inserted into the upper thrust portion 42 from below, and a portion 471 of the upper thrust portion 42 which is defined in the upper portion thereof and which is arranged to project radially inward is arranged in axial contact with an upper end of the shaft portion 41. Axial positioning of the upper thrust portion 42 relative to the shaft portion 41 is thereby achieved. The provision of the portion 471 contributes to securely preventing a downward movement of the upper thrust portion 42. Also, referring to FIG. 24, the outer circumferential surface 411 of the shaft portion 41 may include a shoulder portion 472. In this case, a radially inner end portion of a bottom portion of the upper thrust portion 42 can be arranged in axial contact with the shoulder portion 472 to achieve the axial positioning of the upper thrust portion 42 relative to the shaft portion 41. The same holds true for other preferred embodiments.

The seal cap 44 or 44a may be welded to the upper hub tubular portion 53 or 53a, for example. The lower thrust portion 43 and the base plate 21 may be defined by a single continuous member, for example. In this case, a reduction in the number of components of the motor is achieved. Also, in each of the first and second preferred embodiments, the shaft portion 41 and the upper thrust portion 42 may be defined by separate members. Also, the lower plate portion 431 and the outer tubular portion 432 may be defined by separate members. Also, the lower thrust portion 43 and the shaft portion 41 may be defined by a single continuous member.

In the groove upper portion of the upper radial dynamic pressure groove array 711 illustrated in FIG. 5, a plurality of oblique grooves may be arranged to extend obliquely along the grooves constituting the upper radial dynamic pressure groove array 711. Also, in the groove upper portion, each of the grooves constituting the upper radial dynamic pressure groove array 711 may be arranged to have a greater depth than in the groove lower portion. This leads to an increased axially downward pressure acting on the lubricating oil 45. The same holds true for the groove lower portion of the lower radial dynamic pressure groove array 712. Also, the upper portion and the lower portion of each of the grooves that define the upper radial dynamic pressure groove array 711 may be arranged to have substantially the same length. Also, the upper portion and the lower portion of each of the grooves that constitute the lower radial dynamic pressure groove array 712 may be arranged to have substantially the same length. A variety of modifications can be made to the length, depth, width, and so on of each of the dynamic pressure grooves without departing from the scope and spirit of the present invention.

Each of the upper thrust dynamic pressure groove array 721 and the lower thrust dynamic pressure groove array 722 may be arranged in the herringbone pattern. In this case, a radially outer portion of each of upper thrust dynamic pressure grooves that define the upper thrust dynamic pressure groove array 721 is arranged to have a length greater than that of a radially inner portion thereof, and a radially outer portion of each of lower thrust dynamic pressure grooves that define the lower thrust dynamic pressure groove array 722 is arranged to have a length greater than that of a radially inner portion thereof, in order to generate a radially inward pressure acting on the lubricating oil 45. Note that a plurality of oblique grooves may be arranged between the radially outer portions of the thrust dynamic pressure grooves. The radially outer portion of each thrust dynamic pressure groove may be arranged to have a depth greater than that of the radially inner portion thereof. Although a direction in which the lubricating oil 45 circulates has not been specified in the description of any of the above-described preferred embodiments, the direction in which the lubricating oil 45 circulates may be determined to be either a counterclockwise direction or a clockwise direction in FIG. 4.

Figure 25:
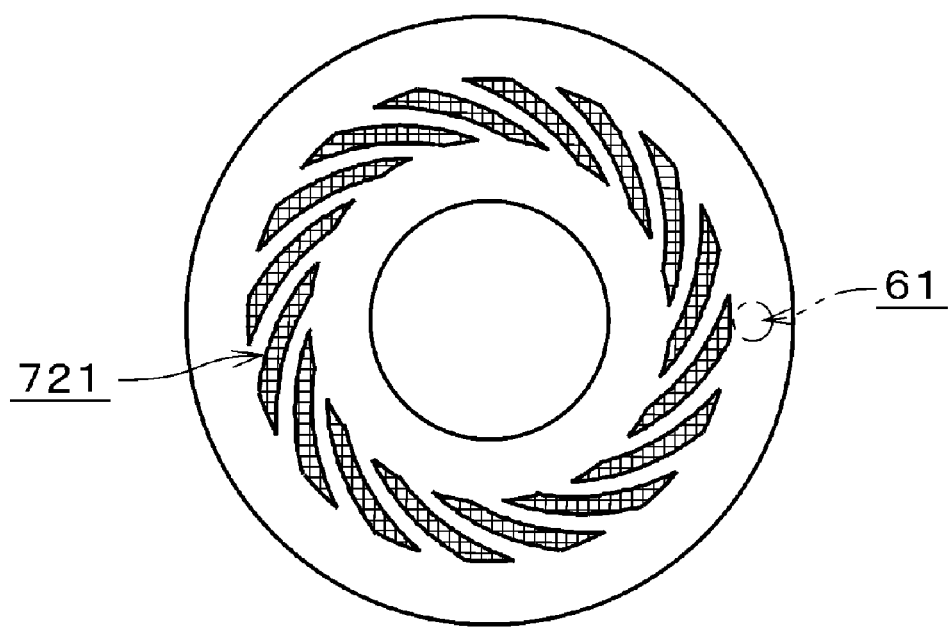
FIG. 25 is a bottom view of a shaft portion and an upper thrust portion according to yet another preferred embodiment of the present invention.
Figure 26:
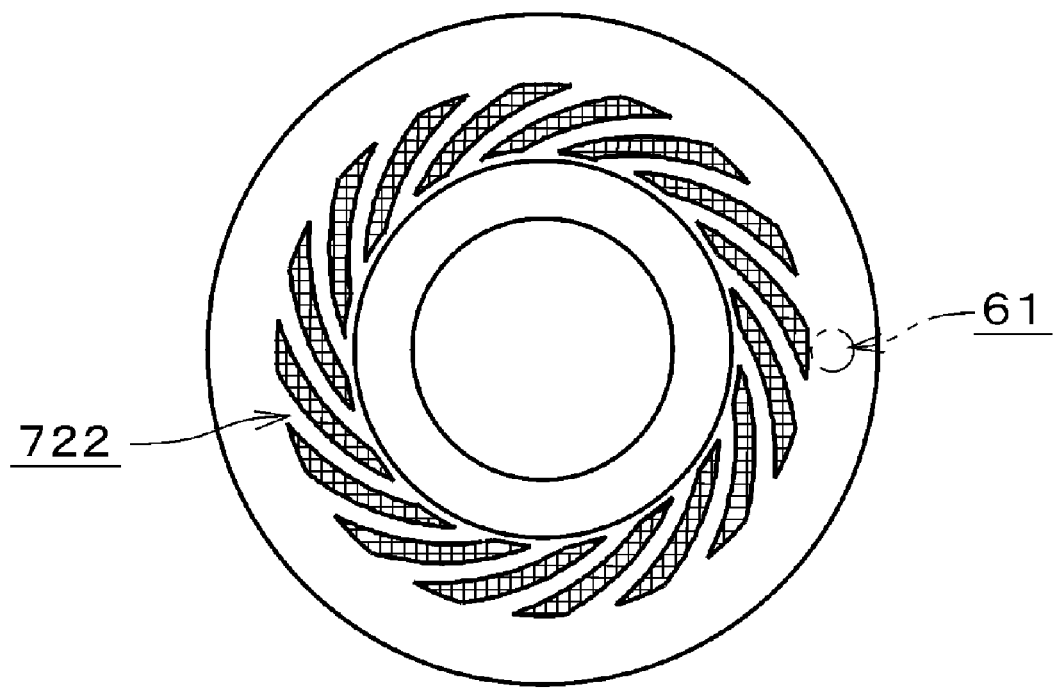
FIG. 26 is a plan view of a lower thrust portion according to another preferred embodiment of the present invention.

In FIG. 4, in the case where the lower surface 421 of the upper thrust portion 42 is arranged to have a sufficient area, the upper thrust dynamic pressure groove array 721 may be arranged radially inward of the upper end opening of the communicating hole 61 as illustrated in FIG. 25. Furthermore, the upper thrust dynamic pressure groove array 721 may be arranged farther radially inward of the communicating hole 61 than in the case of FIG. 25. Similarly, in the case where the upper surface 435 of the outer tubular portion 432 is arranged to have a sufficient area, the lower thrust dynamic pressure groove array 722 may be arranged radially inward of the lower end opening of the communicating hole 61 as illustrated in FIG. 26. Furthermore, the lower thrust dynamic pressure groove array 722 may be arranged farther radially inward of the communicating hole 61 than in the case of FIG. 26. In the upper and lower thrust gaps 651 and 652, an upper thrust dynamic pressure groove array and a lower thrust dynamic pressure groove array may be arranged in the upper surface 521 and the lower surface 522, respectively, of the flange portion 52. Also, a radial dynamic pressure groove array may be arranged in the outer circumferential surface 411 of the shaft portion 41.

In each of the above-described preferred embodiments, the upper seal gap 661 may be arranged to have a substantially uniform width. In that case, a dynamic pressure groove array is arranged in at least one of the outer circumferential surface 422 of the upper thrust portion 42 and the inner circumferential surface 531 of the upper hub tubular portion 53 to define a so-called pumping seal. A dynamic pressure acting on the lubricating oil 45 in the direction of an interior of the upper seal gap 661 is thereby generated to retain the lubricating oil 45. The same holds true for the lower seal gap 662. Each of the upper seal portion 661a and the lower seal portion 662a may not necessarily be arranged to extend in parallel or substantially in parallel with the central axis J1, but may be arranged to be angled significantly with respect to the central axis J1.

Figure 27:
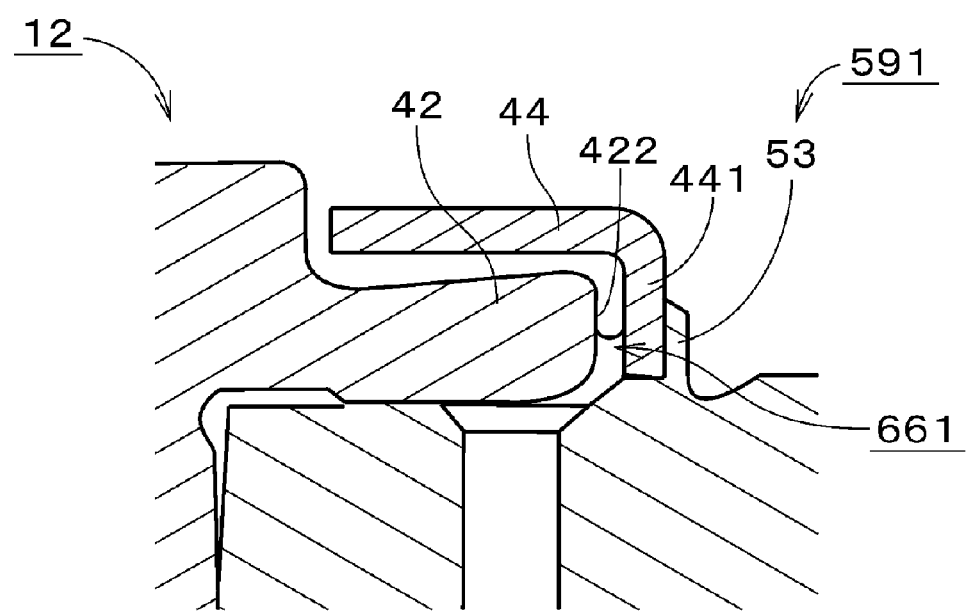
FIG. 27 is a cross-sectional view of a motor according to another preferred embodiment of the present invention.

Referring to FIG. 27, the cap cylindrical portion 441 of the seal cap 44 may be fixed to an inside of the upper hub tubular portion 53. In this case, an inner circumferential surface of the tubular portion of the upper hub annular portion 591 is defined by an inner circumferential surface of the cap cylindrical portion 441, and the upper seal gap 661 is defined between the inner circumferential surface of the cap cylindrical portion 441 and the outer circumferential surface 422 of the upper thrust portion 42. The cap cylindrical portion 441 may be regarded as a portion of the upper hub tubular portion 53. It is, however, more preferable that at least the inner circumferential surface of the tubular portion of the upper hub annular portion 591 is defined by the inner circumferential surface of the upper hub tubular portion 53 or 53a so that the volume of the lubricating oil 45 in the upper seal gap 661 can be checked and verified before the attachment of the seal cap 44. In the upper hub annular portion 591, the upper hub tubular portion and the seal cap may be defined by a single continuous member, for example. Also, in the case where the likelihood of a leakage of the lubricating oil 45 is low, the seal cap 44 or 44a may be eliminated with the upper hub annular portion being defined by only the upper hub tubular portion 53 or 53a.

Features of the above-described preferred embodiments and modifications thereof may be combined as appropriate as long as no conflict arises.

Preferred embodiments of the present invention is specifically applicable to motors used to drive a disk, however, the present invention is also usable in other types of motors.

Only selected preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the preferred embodiments according to the present invention is provided for illustration only, and not for limiting the invention as defined by the appended claims and their equivalents.

What is claimed is:

1. A motor comprising:
   a stationary portion including a stator; and
   a rotating portion including a rotor magnet and being rotatably supported by the stationary portion through a lubricating oil; wherein the stationary portion includes:
   a shaft portion centered on a central axis extending in a vertical direction; and
   an upper thrust portion arranged to extend radially outward from an upper portion of the shaft portion;
   the rotating portion includes:
   a sleeve portion arranged opposite an outer circumferential surface of the shaft portion and a lower surface of the upper thrust portion; and
   an upper hub annular portion including a tubular portion and an annular cover portion, the tubular portion being arranged to extend upward from an outer edge portion of the sleeve portion, and arranged opposite an outer circumferential surface of the upper thrust portion, the annular cover portion being arranged to extend radially inward from the tubular portion;
   the lower surface of the upper thrust portion and an upper surface of the sleeve portion are arranged to together define an upper thrust gap therebetween, the lubricating oil is arranged in the upper thrust gap, the outer circumferential surface of the upper thrust portion and an inner circumferential surface of the tubular portion are arranged to together define an upper seal portion therebetween, the upper thrust gap is arranged in communication with the upper seal portion, and the upper seal portion has a surface of the lubricating oil located therein;
   the upper thrust portion includes:
   an inner cylindrical surface arranged substantially in a shape of a cylinder, arranged radially inward of the outer circumferential surface to extend in the vertical direction or substantially in the vertical direction, and including an upper end arranged at a level higher than that of an upper end of the outer circumferential surface; and
   an outer annular surface arranged radially outward of the inner cylindrical surface, arranged at a level lower than that of the upper end of the inner cylindrical surface, and defined by an annular surface perpendicular or substantially perpendicular to the central axis;
   the outer annular surface and a lower surface of the annular cover portion are arranged to together define an annular radially extending gap therebetween, the radially extending gap including an axial width smaller than a maximum width of the upper seal portion; and
   the inner cylindrical surface and a radially inner edge of the annular cover portion are arranged to together define an annular axially extending gap therebetween, the axially extending gap having a radial width smaller than the maximum width of the upper seal portion.

2. The motor according to claim 1, wherein the upper thrust portion further includes an annular groove portion recessed axially downward defined between the inner cylindrical surface and the outer annular surface.

3. The motor according to claim 2, wherein the radially inner edge of the annular cover portion includes an inner annular projecting portion arranged to project in an axial direction.

4. The motor according to claim 3, wherein
   the inner annular projecting portion is arranged to project axially downward; and
   a lower end of the inner annular projecting portion is arranged inside of the groove portion.

5. The motor according to claim 1, wherein the radially inner edge of the annular cover portion includes an inner annular projecting portion arranged to project in an axial direction.

6. The motor according to claim 1, wherein the lower surface of the annular cover portion includes a first oil-repellent film region coated with an oil-repellent film, the first oil-repellent film region being annular and arranged to surround the central axis.

7. The motor according to claim 6, wherein
   the lower surface of the annular cover portion includes an annular shoulder portion arranged radially inward of the radially extending gap to extend upward or downward while extending radially inward; and
   at least a portion of the first oil-repellent film region is arranged radially outward of the annular shoulder portion.

8. The motor according to claim 6, wherein the outer annular surface includes a second oil-repellent film region coated with an oil-repellent film, the second oil-repellent film region being annular and arranged to surround the central axis.

9. The motor according to claim 1, wherein
   the upper hub annular portion includes an upper hub tubular portion arranged to extend upward from the sleeve portion, and arranged substantially in a shape of a cylinder, and an annular cap member including an outer edge portion fixed to the upper hub tubular portion;
   at least the inner circumferential surface of the tubular portion is defined by an inner circumferential surface of the upper hub tubular portion; and
   the annular cover portion is defined by at least a portion of the cap member.

10. The motor according to claim 1, wherein
    the sleeve portion includes a communicating hole arranged to extend therethrough from the upper surface to a lower surface thereof;
    the shaft portion and the sleeve portion are arranged to together define a first gap therebetween, the first gap including a dynamic pressure bearing defined therein;
    the upper seal portion is arranged radially outward of the dynamic pressure bearing, a lower seal portion extending downward is arranged radially outward of the dynamic pressure bearing, the lower seal portion includes another surface of the lubricating oil located therein, and the upper and lower seal portions are arranged in communication with each other through the communicating hole;
    the communicating hole and a space extending from the upper seal portion to the lower seal portion through the first gap are filled with the lubricating oil; and
    an axial distance between the surface of the lubricating oil in the upper seal portion and the surface of the lubricating oil in the lower seal portion is arranged to be shorter than an axial distance between an upper end and a lower end of the dynamic pressure bearing.

11. The motor according to claim 1, wherein
    the stationary portion includes:
    a lower plate portion arranged to extend radially outward from a lower portion of the shaft portion; and
    an outer tubular portion arranged to extend upward from an outer edge portion of the lower plate portion;

the rotating portion includes:
an inner tubular portion including an inner circumferential surface arranged to define a first gap together with the outer circumferential surface of the shaft portion, and an outer circumferential surface arranged to define a second gap together with an inner circumferential surface of the outer tubular portion; and
a flange portion arranged to project radially outward from the inner tubular portion, and including a lower surface arranged to define a third gap together with an upper surface of the outer tubular portion, and a communicating hole arranged to extend therethrough from an upper surface to the lower surface thereof;
the upper seal portion is arranged radially outward of the first gap, a lower seal portion is arranged radially outward of the second gap, the lower seal portion includes another surface of the lubricating oil located therein, and the upper seal portion and the lower seal portion are arranged in communication with each other through the communicating hole;
the communicating hole and a space extending from the upper seal portion to the lower seal portion through the first gap, the second gap, and the third gap are filled with the lubricating oil;
the first gap includes a dynamic pressure bearing defined therein; and
the third gap includes a dynamic pressure generation portion arranged to produce a radially inward pressure acting on the lubricating oil.

12. The motor according to claim 1, wherein
the stationary portion includes:
a lower plate portion arranged to extend radially outward from a lower portion of the shaft portion;
an outer tubular portion arranged to extend upward from an outer edge portion of the lower plate portion; and
a base portion to which an outer circumference of the outer tubular portion is fixed;
the sleeve portion includes a communicating hole arranged to extend therethrough from the upper surface to a lower surface thereof;
the shaft portion and the sleeve portion are arranged to together define a first gap therebetween, the first gap including a dynamic pressure bearing defined therein;
the upper seal portion is arranged radially outward of the dynamic pressure bearing, a lower seal portion extending downward is arranged radially outward of the dynamic pressure bearing, the lower seal portion includes another surface of the lubricating oil located therein, and the upper and lower seal portions are arranged in communication with each other through the communicating hole;
the communicating hole and a space extending from the upper seal portion to the lower seal portion through the first gap are filled with the lubricating oil; and
a fixing region where the outer tubular portion and the base portion are fixed to each other is arranged to overlap with the dynamic pressure bearing in a radial direction.

13. A motor comprising:
a stationary portion including a stator; and
a rotating portion including a rotor magnet, and rotatably supported by the stationary portion through a lubricating oil; wherein
the stationary portion includes:
a shaft portion centered on a central axis extending in a vertical direction; and
an upper thrust portion arranged to extend radially outward from an upper portion of the shaft portion;
the rotating portion includes:
a sleeve portion arranged opposite an outer circumferential surface of the shaft portion and a lower surface of the upper thrust portion; and
an upper hub annular portion including a tubular portion and an annular cover portion, the tubular portion being arranged to extend upward from an outer edge portion of the sleeve portion, and arranged opposite an outer circumferential surface of the upper thrust portion, the annular cover portion being arranged to extend radially inward from the tubular portion;
the lower surface of the upper thrust portion and an upper surface of the sleeve portion are arranged to together define an upper thrust gap therebetween, the lubricating oil is arranged in the upper thrust gap, the outer circumferential surface of the upper thrust portion and an inner circumferential surface of the tubular portion are arranged to together define an upper seal portion therebetween, the upper thrust gap is arranged in communication with the upper seal portion, and the upper seal portion has a surface of the lubricating oil located therein;
the upper thrust portion includes:
an inner cylindrical surface arranged substantially in a shape of a cylinder, arranged radially inward of the outer circumferential surface to extend in the vertical direction or substantially in the vertical direction, and including an upper end arranged at an axial level higher than that of an upper end of the outer circumferential surface;
an outer annular surface arranged radially outward of the inner cylindrical surface, arranged at a level lower than that of the upper end of the inner cylindrical surface, and defined by an annular surface substantially perpendicular to the central axis; and
an annular groove portion recessed downward defined between the inner cylindrical surface and the outer annular surface; and
a radially inner edge of the annular cover portion includes an inner annular projecting portion arranged to project downward, and a lower end of the inner annular projecting portion is arranged inside the groove portion.

14. The motor according to claim 13, wherein
the upper hub annular portion includes an upper hub tubular portion arranged to extend upward from the sleeve portion, and arranged substantially in a shape of a cylinder, and an annular cap member including an outer edge portion fixed to the upper hub tubular portion;
at least the inner circumferential surface of the tubular portion is defined by an inner circumferential surface of the upper hub tubular portion; and
the annular cover portion is defined by at least a portion of the cap member.

15. The motor according to claim 14, wherein
a radially outer edge of the cap member includes an outer annular projecting portion arranged to project upward; and
an outer circumferential surface of the outer annular projecting portion is fixed to the upper hub tubular portion.

16. The motor according to claim 14, wherein an upper portion of the upper hub tubular portion includes a third oil-repellent film region coated with an oil-repellent film, the third oil-repellent film region being annular and arranged to surround the central axis.

17. The motor according to claim 16, wherein
the upper hub tubular portion includes a shoulder portion defined in a region axially opposed to the cap member, the shoulder portion being arranged to extend upward while extending radially outward; and at least a portion of the third oil-repellent film region is arranged radially inward of the shoulder portion.

18. The motor according to claim 13, wherein the sleeve portion includes a communicating hole arranged to extend therethrough from the upper surface to a lower surface thereof;

the shaft portion and the sleeve portion are arranged to together define a first gap therebetween, the first gap including a dynamic pressure bearing defined therein;

the upper seal portion is arranged radially outward of the dynamic pressure bearing, a lower seal portion extending downward is arranged radially outward of the dynamic pressure bearing, the lower seal portion includes another surface of the lubricating oil located therein, and the upper and lower seal portions are arranged in communication with each other through the communicating hole;

the communicating hole and a space extending from the upper seal portion to the lower seal portion through the first gap are filled with the lubricating oil; and an axial distance between the surface of the lubricating oil in the upper seal portion and the surface of the lubricating oil in the lower seal portion is arranged to be shorter than an axial distance between an upper end and a lower end of the dynamic pressure bearing.

19. The motor according to claim 18, wherein the stationary portion further includes:

a lower plate portion arranged to extend radially outward from a lower portion of the shaft portion; and an outer tubular portion arranged to extend upward from an outer edge portion of the lower plate portion;

the sleeve portion includes:

an inner tubular portion including an inner circumferential surface arranged to define the first gap together with the outer circumferential surface of the shaft portion, and an outer circumferential surface arranged to define a second gap together with an inner circumferential surface of the outer tubular portion; and a flange portion arranged to project radially outward from the inner tubular portion, and including a lower surface arranged to define a third gap together with an upper surface of the outer tubular portion;

the dynamic pressure bearing includes an upper dynamic pressure bearing portion and a lower dynamic pressure bearing portion; and the third gap is arranged axially above the lower dynamic pressure bearing portion.

20. The motor according to claim 13, wherein the stationary portion includes:

a lower plate portion arranged to extend radially outward from a lower portion of the shaft portion; and an outer tubular portion arranged to extend upward from an outer edge portion of the lower plate portion;

the rotating portion includes:

an inner tubular portion including an inner circumferential surface arranged to define a first gap together with the outer circumferential surface of the shaft portion, and an outer circumferential surface arranged to define a second gap together with an inner circumferential surface of the outer tubular portion; and a flange portion arranged to project radially outward from the inner tubular portion, and including a lower surface arranged to define a third gap together with an upper surface of the outer tubular portion, and a communicating hole arranged to extend therethrough from an upper surface to the lower surface thereof;

the upper seal portion is arranged radially outward of the first gap, a lower seal portion is arranged radially outward of the second gap, the lower seal portion has another surface of the lubricating oil located therein, and the upper and lower seal portions are arranged in communication with each other through the communicating hole;

the communicating hole and a space extending from the upper seal portion to the lower seal portion through the first gap, the second gap, and the third gap are filled with the lubricating oil;

the first gap includes a dynamic pressure bearing defined therein; and the third gap includes a dynamic pressure generation portion arranged to induce a radially inward pressure acting on the lubricating oil.

21. The motor according to claim 13, wherein the stationary portion includes:

a lower plate portion arranged to extend radially outward from a lower portion of the shaft portion;

an outer tubular portion arranged to extend upward from an outer edge portion of the lower plate portion; and a base portion to which an outer circumference of the outer tubular portion is fixed;

the sleeve portion includes a communicating hole arranged to extend therethrough from the upper surface to a lower surface thereof;

the shaft portion and the sleeve portion are arranged to together define a first gap therebetween, the first gap including a dynamic pressure bearing defined therein;

the upper seal portion is arranged radially outward of the dynamic pressure bearing, a lower seal portion extending downward is arranged radially outward of the dynamic pressure bearing, the lower seal portion includes another surface of the lubricating oil located therein, and the upper and lower seal portions are arranged in communication with each other through the communicating hole;

the communicating hole and a space extending from the upper seal portion to the lower seal portion through the first gap are filled with the lubricating oil; and a fixing region where the outer tubular portion and the base portion are fixed to each other is arranged to overlap with the dynamic pressure bearing in a radial direction.

22. A storage disk drive comprising:

a motor arranged to rotate a disk, comprising:

a stationary portion including a stator; and a rotating portion including a rotor magnet and being rotatably supported by the stationary portion through a lubricating oil; wherein the stationary portion includes:

a shaft portion centered on a central axis extending in a vertical direction; and an upper thrust portion arranged to extend radially outward from an upper portion of the shaft portion;

the rotating portion includes:

a sleeve portion arranged opposite an outer circumferential surface of the shaft portion and a lower surface of the upper thrust portion; and an upper hub annular portion including a tubular portion and an annular cover portion, the tubular portion being arranged to extend upward from an outer edge portion of the sleeve portion, and arranged opposite an outer circumferential surface of the upper thrust portion, the annular cover portion being arranged to extend radially inward from the tubular portion;

the lower surface of the upper thrust portion and an upper surface of the sleeve portion are arranged to together define an upper thrust gap therebetween, the lubricating oil is arranged in the upper thrust gap, the outer circumferential surface of the upper thrust portion and an inner circumferential surface of the tubular portion are arranged to together define an upper seal portion therebetween, the upper thrust gap is arranged in communication with the upper seal portion, and the upper seal portion has a surface of the lubricating oil located therein;

the upper thrust portion includes:

an inner cylindrical surface arranged substantially in a shape of a cylinder, arranged radially inward of the outer circumferential surface to extend in the vertical direction or substantially in the vertical direction, and including an upper end arranged at a level higher than that of an upper end of the outer circumferential surface; and an outer annular surface arranged radially outward of the inner cylindrical surface, arranged at a level lower than that of the upper end of the inner cylindrical surface, and defined by an annular surface perpendicular or substantially perpendicular to the central axis;

the outer annular surface and a lower surface of the annular cover portion are arranged to together define an annular radially extending gap therebetween, the radially extending gap including an axial width smaller than a maximum width of the upper seal portion; and the inner cylindrical surface and a radially inner edge of the annular cover portion are arranged to together define an annular axially extending gap therebetween, the axially extending gap having a radial width smaller than the maximum width of the upper seal portion;

an access portion arranged to perform at least one of reading and writing of information from or to the disk; and a housing arranged to contain the disk, the motor, and the access portion.

23. The storage disk drive according to claim 22, wherein the housing includes an upper plate member; and a lower surface of the upper plate member and an upper surface of the annular cover portion are arranged to together define an annular gap having a small axial width therebetween.

* * * * *